US011997441B2

(12) United States Patent
Zhang et al.

(10) Patent No.: US 11,997,441 B2
(45) Date of Patent: May 28, 2024

(54) WIRELESS EARPHONE

(71) Applicant: Huawei Technologies Co., Ltd., Shenzhen (CN)

(72) Inventors: Junhong Zhang, Dongguan (CN); Huiliang Xu, Dongguan (CN); Zhongying Long, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 169 days.

(21) Appl. No.: 17/780,822

(22) PCT Filed: Nov. 25, 2020

(86) PCT No.: PCT/CN2020/131590
§ 371 (c)(1),
(2) Date: May 27, 2022

(87) PCT Pub. No.: WO2021/104336
PCT Pub. Date: Jun. 3, 2021

(65) Prior Publication Data

US 2023/0007378 A1 Jan. 5, 2023

(30) Foreign Application Priority Data

Nov. 30, 2019 (CN) ......................... 201911209306.7

(51) Int. Cl.
*H04R 1/10* (2006.01)
*H01Q 1/27* (2006.01)
*H01Q 1/36* (2006.01)

(52) U.S. Cl.
CPC ......... *H04R 1/1016* (2013.01); *H04R 1/1058* (2013.01); *H01Q 1/273* (2013.01);
(Continued)

(58) Field of Classification Search
CPC .. H04R 1/1016; H04R 1/1058; H04R 1/1025; H04R 2420/07; H04R 1/1091;
(Continued)

(56) References Cited

U.S. PATENT DOCUMENTS 10,412,481 B1 9/2019 Wu et al.
2008/0166907 A1* 7/2008 Sanford ................ H01R 43/24 439/345

(Continued)

FOREIGN PATENT DOCUMENTS

CN 101420060 A 4/2009
CN 103248975 A 8/2013

(Continued)

OTHER PUBLICATIONS

Xu Chen, Research on Bluetooth Technology and Its Application, 2009, 3 pages (with an English abstract).

*Primary Examiner* — Tuan D Nguyen
(74) *Attorney, Agent, or Firm* — SLATER MATSIL, LLP.

(57) ABSTRACT

In an embodiment a wireless earphone includes an earbud portion having a speaker module, a stalk portion having a battery, wherein the earbud portion is connected to one end of the stalk portion, a circuit board and a first antenna being a slot antenna, wherein the circuit board extends from the earbud portion to an end of the stalk portion away from the earbud portion, wherein the circuit board is connected to the speaker module and the battery, wherein the circuit board comprises a reference ground, the reference ground extending from one end of the circuit board to another end of the circuit board, and wherein a slot is disposed on the reference ground forming a radiator of the slot antenna, the slot being located in the stalk portion and extending along a length direction of the stalk portion.

18 Claims, 27 Drawing Sheets

(52) U.S. Cl.
CPC ............. *H01Q 1/36* (2013.01); *H04R 1/1025* (2013.01); *H04R 2420/07* (2013.01)

(58) Field of Classification Search
CPC . H04R 1/10; H01Q 1/273; H01Q 1/36; H01Q 13/10; H01Q 21/29; H01Q 1/44; H01Q 1/50
See application file for complete search history.

(56) References Cited

U.S. PATENT DOCUMENTS

| | | | |
|---|---|---|---|
| 2010/0156728 A1 | 6/2010 | Alvey et al. | |
| 2017/0201821 A1* | 7/2017 | McAuliffe ........... | H04R 1/1066 |
| 2017/0223160 A1 | 8/2017 | Duddy et al. | |
| 2018/0041617 A1 | 2/2018 | Shamsoddini et al. | |

FOREIGN PATENT DOCUMENTS

| | | | |
|---|---|---|---|
| CN | 105449358 | A | 3/2016 |
| CN | 106331928 | A | 1/2017 |
| CN | 106537690 | A | 3/2017 |
| CN | 107331953 | A | 11/2017 |
| CN | 108281759 | A | 7/2018 |
| CN | 108539377 | A | 9/2018 |
| CN | 208240880 | U | 12/2018 |
| CN | 109616760 | A | 4/2019 |
| CN | 209017254 | U | 6/2019 |
| CN | 110166866 | A | 8/2019 |
| CN | 110336118 | A | 10/2019 |
| CN | 110336120 | A | 10/2019 |
| CN | 110519671 | A | 11/2019 |
| EP | 3425734 | A1 | 1/2019 |
| EP | 4024886 | A1 | 7/2022 |
| WO | 2017181376 | A1 | 10/2017 |

* cited by examiner

WIRELESS EARPHONE

CROSS-REFERENCE TO RELATED APPLICATIONS

This application is a National Stage of International Patent Application No. PCT/CN2020/131590, filed on Nov. 25, 2020, which claims priority to Chinese Patent Application No. 201911209306.7, filed on Nov. 30, 2019, both of which are hereby incorporated by reference in their entireties.

TECHNICAL FIELD

Embodiments of this application relate to the field of electronic device technologies, and in particular, to a wireless earphone.

BACKGROUND

Currently, due to convenience and miniaturization, wireless earphones are quite popular with users, and are becoming more widely used. However, because an internal structure of a wireless earphone is comparatively small, how to reduce a volume occupied by an antenna and save internal space of a wireless earphone when disposing the antenna inside the wireless earphone is an urgent problem to be resolved.

SUMMARY

This application provides a wireless earphone. An antenna in the wireless earphone occupies a comparatively small volume, so that space in the wireless earphone is saved.

According to a first aspect, an embodiment of this application provides a wireless earphone. The wireless earphone has an earbud portion and a stalk portion. The earbud portion is connected to one end of the stalk portion. The earbud portion is configured with a speaker module. The stalk portion is configured with a battery. The wireless earphone includes a circuit board and a first antenna. The first antenna is a slot antenna. The circuit board extends from the earbud portion to an end, of the stalk portion, that is away from the earbud portion. The circuit board is connected to the speaker module and the battery. The circuit board includes a reference ground. The reference ground extends from one end of the circuit board to the other end of the circuit board. A slot is disposed on the reference ground to form a radiator of the slot antenna. The slot is located in the stalk portion and extends along a length direction of the stalk portion.

In this embodiment of this application, an antenna in the wireless earphone includes the slot antenna, and the slot antenna is disposed on the circuit board configured to connect the speaker module and the battery. In other words, the antenna of the wireless earphone and the circuit board in the wireless earphone are integrated. This can prevent the antenna in the wireless earphone from occupying internal space of the wireless earphone. In addition, the antenna applicable to the wireless earphone can be obtained by disposing the slot on the circuit board, so that a structure is simple. This can simplify an internal structure of the wireless earphone, and simplify an assembly technique of the wireless earphone.

In some implementations of this application, the slot antenna further includes a coupling stub. The coupling stub is located in the slot. An extension direction of the coupling stub is the same as the extension direction of the slot. A feed point is disposed on the coupling stub. A radio frequency signal is fed to the radiator of the slot antenna from the feed point. The coupling stub is disposed in the slot, so as to adjust an impedance of the slot antenna, so that the impedance of the slot antenna is close to 50Ω. In this way, the slot antenna can have comparatively good radiation performance.

In some implementations of this application, the coupling stub extends from an end, of the slot, closer to the earbud portion to an end, of the slot, that is away from the earbud portion; and the feed point is located at an end, of the coupling stub, closer to the earbud portion. The feed point is located at the end, of the coupling stub, closer to the earbud portion, so as to reduce a transmission distance of a radio frequency signal and reduce a loss of the radio frequency signal on a transmission path.

In some implementations of this application, the wireless earphone includes a microstrip. One end of the microstrip is electrically connected to the feed point. The microstrip is configured to transmit a radio frequency signal for the slot antenna. The microstrip includes a transmission portion and a coupling portion connected to the transmission portion. The coupling portion extends in the slot to form the coupling stub of the slot antenna. A partial structure of the microstrip configured to transmit a radio frequency signal forms the coupling stub, so that a quantity of structures electrically connecting the microstrip to the coupling stub can be reduced, thereby simplifying the internal structure of the wireless earphone, and simplifying the assembly technique of the wireless earphone.

In some implementations of this application, a length of the slot is a quarter of a wavelength corresponding to an operating frequency band of the slot antenna, and an opening is disposed at one end of the slot. In this implementation, the opening is formed at one end of the slot, so that the slot antenna can have comparatively good antenna performance when the length of the slot is a quarter. The length of the slot is smaller than that of a slot whose length is a ½ wavelength, and is more applicable to wireless earphones with comparatively small volumes.

In some implementations of this application, the slot antenna includes a feed point. A radio frequency signal is fed to the radiator of the slot antenna from the feed point. The feed point is located at a periphery of the slot, and a distance between a location of the feed point and an end, of the slot, far away from the opening is a 1/20 wavelength. In this implementation, when the distance between the location of the feed point and the end, of the slot, far away from the opening is the 1/20 wavelength, an antenna impedance can be closer to 50Ω, thereby achieving a better antenna effect.

In some implementations of this application, the stalk portion includes a connecting segment connected to the earbud portion, and a bottom segment located on one side of the connecting segment. An arrangement direction of the earbud portion and the connecting segment intersects an arrangement direction of the connecting segment and the bottom segment. The battery is located in the bottom segment. The circuit board includes a first section, a second section, and a third section that are sequentially connected. The first section is located at the earbud portion, the second section is located at the connecting segment, and the third section is located at the bottom segment. From a location at which the third section is connected to the second section, the slot is formed in a direction in which the third section extends away from the second section. A sum of electrical lengths of the first section and the second section is greater than or equal to a ¼ wavelength. An electrical length of the third section is greater than or equal to the ¼ wavelength. In this implementation, the sum of the electrical lengths of the first section and the second section of the circuit board is approximately the ¼ wavelength or greater than the ¼ wavelength, so that a ½ wavelength mode generated by the circuit board can be excited, thereby achieving comparatively high radiation efficiency. In some implementations of this application, the stalk portion includes a connecting segment connected to the earbud portion, and a top segment and bottom segment that are located on two sides of the connecting segment. An arrangement direction of the earbud portion and the connecting segment intersects an arrangement direction of the connecting segment and the bottom segment and top segment. The battery is located in the bottom segment. The wireless earphone further includes a second antenna. The second antenna is located in the top segment. A radiator of the second antenna includes a feeding end and an extreme end far away from the feeding end. The feeding end is closer to the connecting segment than the extreme end.

The second antenna is added to the top segment of the wireless earphone, where the feeding end of the second antenna is closer to the connecting segment and the extreme end is far away from the feeding end, so that a direction of an antenna current generated by the circuit board through excitation by the second antenna can be a direction from the feeding end to the extreme end, to obtain a second equivalent current intersecting a first equivalent current generated by the circuit board through excitation by the slot antenna. In this way, an antenna directivity pattern of the slot antenna and an antenna directivity pattern of the second antenna can be complementary to each other, thereby improving received signal strength of the wireless earphone in each angle. Compared with a wireless earphone having only a single antenna, the wireless earphone in this application may have a plurality of polarization manners (for example, vertical polarization and horizontal polarization) of a received signal, and the slot antenna and the second antenna may be designed for different polarizations, so that good signal strength can be obtained regardless of which polarization manner is used for a received signal. A probability of matching a polarization manner of the wireless earphone and a manner of arrival can be improved, thereby improving received signal strength. In addition, the directivity patterns of the slot antenna and the second antenna are complementary to each other, and the slot antenna and the second antenna can be designed for different polarizations, so as to avoid a received signal with strong interference. When quality of a signal received by one antenna is poor, receiving may be switched to the other antenna, thereby improving received signal strength.

In some implementations of this application, the slot antenna excites the circuit board to generate the first equivalent current, and a direction of the first equivalent current is from the end, of the stalk portion, that is away from the earbud portion to an end, of the earbud portion, that is away from the stalk portion; and the second antenna excites the circuit board to generate the second equivalent current, and a direction of the second equivalent current intersects the direction of the first equivalent current.

In some implementations of this application, the circuit board includes a first section, a second section, and a third section that are sequentially connected. The first section is located at the earbud portion, the second section is located at the connecting segment, and the third section is located at the bottom segment. An electrical length of the radiator of the second antenna is a ¼ wavelength, and an electrical length of the first section is the ¼ wavelength.

In some implementations of this application, the slot antenna includes the feed point, the feed point is located at an end, of the third section, closer to the second section, the feeding end of the second antenna is close to an end, of the second section, that is away from the third section, and an electrical length of the second section of the circuit board is the ¼ wavelength. The feed point of the slot antenna is located at the end, of the third section, closer to the second section, and a feed point of the second antenna is close to the end, of the second section, that is away from the third section. Therefore, when the second section has a specific electrical length (for example, the ¼ wavelength), isolation between the slot antenna and the second section can be raised, so that both the slot antenna and the second antenna have good antenna performance.

In some implementations, the direction of the second equivalent current is from the end, of the earbud portion, that is away from the stalk portion to the extreme end, and the direction of the first equivalent current is orthogonal to the direction of the second equivalent current.

In some implementations of this application, an electrical length of the third section of the circuit board is the ¼ wavelength. In this implementation, the electrical lengths of the first section, the second section, and the third section of the circuit board are all approximately the ¼ wavelength. Therefore, an electrical length of the circuit board from the feed point of the second antenna to a side of the third section is a sum of the electrical lengths of the second section and the third section, and is close to a half wavelength; and an electrical length of the circuit board from the feed point of the second antenna to a side of the first section is the electrical length of the first section, and is close to the ¼ wavelength. Therefore, an antenna impedance formed by the circuit board from the feed point of the second antenna to the side of the third section is a high impedance, and an antenna impedance formed by the circuit board from the feed point of the second antenna to the side of the first section is a low impedance (close to 50Ω in this embodiment). A ground current of the second antenna is mainly distributed on the first section of the circuit board, and a direction of the ground current is from an end, of the first section, that is away from the second section to the feeding end. Therefore, the second antenna can excite generation of a common mode, and can generate the second equivalent current approximately orthogonal to the first equivalent current, so that the antenna directivity pattern of the slot antenna and the antenna directivity pattern of the second antenna can better complement each other, thereby improving received signal strength of the wireless earphone in each angle. In addition, polarization directions of the slot antenna and the second antenna may be orthogonal, so that good signal strength can be obtained regardless of which polarization manner is used for a received signal. A probability of matching a polarization manner of the wireless earphone and a manner of arrival can be improved, thereby improving received signal strength. In addition, the directivity patterns of the slot antenna and the second antenna are complementary to each other, and the slot antenna and the second antenna can be designed for different polarizations, so as to avoid a received signal with strong interference. When quality of a signal received by one antenna is poor, receiving may be switched to the other antenna, thereby improving received signal strength.

In some implementations of this application, the second section of the circuit board is disposed in the connecting segment in a bent manner, so as to ensure the electrical length of the second section, and reduce a size of internal space, of the wireless earphone, occupied by the second section.

In some implementations of this application, the wireless earphone includes an antenna support, the antenna support is located in the top segment, and the radiator of the second antenna is disposed around the antenna support, so as to ensure an electrical length of the radiator of the second antenna, and reduce a size of internal space, of the wireless earphone, occupied by the second antenna.

In some implementations, the second antenna is a monopole antenna or an inverted F antenna.

In some implementations of this application, the wireless earphone includes a radio frequency front-end circuit. The radio frequency front-end circuit is coupled to the slot antenna and the second antenna, and is configured to transmit radio frequency signals to the slot antenna and the second antenna or process radio frequency signals received by the slot antenna and the second antenna. The radio frequency front-end circuit includes an switching switch, and the switching switch is configured to switch the radio frequency front-end circuit to couple to the slot antenna or the second antenna.

The radio frequency front-end circuit in this implementation includes the switching switch, and uses a switched-diversity design, to switch, based on an actual requirement, to connecting to the slot antenna or the second antenna, thereby improving received signal strength. It may be understood that, with the radio frequency front-end circuit and the antenna in this embodiment, whether to use the slot antenna or the second antenna to transmit a signal can also be selected based on an actual requirement, so as to transmit a signal with comparatively high signal strength.

In some implementations of this application, the wireless earphone includes a radio frequency front-end circuit, the radio frequency front-end circuit includes a first transceiver circuit and a second transceiver circuit, the first transceiver circuit is coupled to the slot antenna, and the second transceiver circuit is coupled to the second antenna.

The radio frequency front-end circuit in this implementation includes two transceiver circuits. The two transceiver circuits can simultaneously receive and process signals received by the slot antenna and the second antenna, thereby simultaneously receiving received signals in different transmission directions or different polarization directions, so as to improve received signal strength.

According to a second aspect, some embodiments of this application further provide a wireless earphone. The wireless earphone includes a speaker module, a battery, a circuit board, and a slot antenna. The circuit board is electrically connected to the speaker module and the battery. The circuit board includes a reference ground. A slot is disposed on the reference ground to form a radiator of the slot antenna.

In this embodiment of this application, an antenna in the wireless earphone includes the slot antenna, and the slot antenna is disposed on the circuit board configured to connect the speaker module and the battery. In other words, the antenna of the wireless earphone and the circuit board in the wireless earphone are integrated. This can prevent the antenna in the wireless earphone from occupying internal space of the wireless earphone. In addition, the antenna applicable to the wireless earphone can be obtained by disposing the slot on the circuit board, so that a structure is simple. This can simplify an internal structure of the wireless earphone, and simplify an assembly technique of the wireless earphone.

DETAILED DESCRIPTION OF ILLUSTRATIVE EMBODIMENTS

The following describes embodiments of this application with reference to the accompanying drawings in embodiments of this application.

Figure 1:
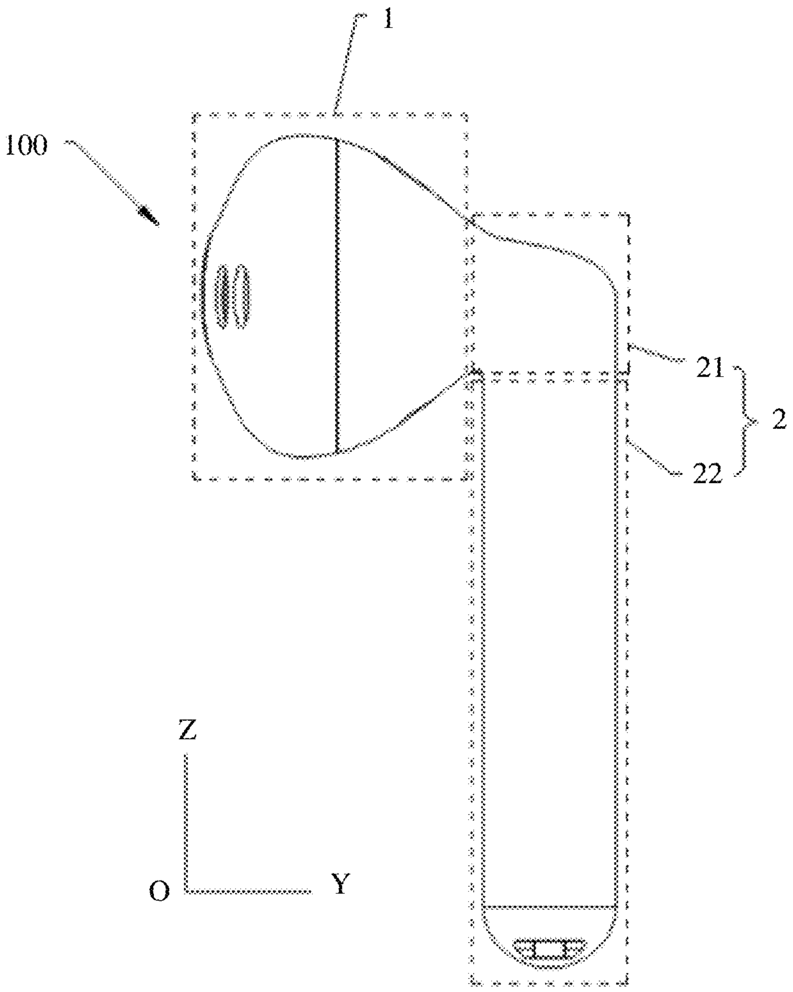
FIG. 1 is a schematic diagram of a structure of a wireless earphone according to an embodiment of this application.

FIG. 1 is a schematic diagram of a structure of a wireless earphone 100 according to an embodiment of this application. For ease of description, the following provides descriptions by using a Z direction shown in FIG. 1 as a longitudinal direction and a Y direction shown in FIG. 1 as a transverse direction.

The wireless earphone 100 has an earbud portion 1 and a stalk portion 2. The earbud portion 1 is configured to be partially inserted into an ear of a user. When the user wears the wireless earphone 100, the earbud portion 1 is partially inserted into the ear of the user. The stalk portion 2 includes a connecting segment 21 connected to the earbud portion 1, and a bottom segment 22 located on one side of the connecting segment 21. The earbud portion 1 and the connecting segment 21 of the stalk portion 2 are sequentially arranged in the transverse direction (the Y direction in FIG. 1). The connecting segment 21 and the bottom segment 22 of the stalk portion 2 are sequentially arranged in the longitudinal direction (the Z direction in FIG. 1). The Y direction is a direction in which the earbud portion 1 is inserted into the ear of the user, and the Z direction is a length direction of the stalk portion 2. Optionally, the Z direction is perpendicular to the Y direction. In another implementation, an included angle between the Z direction and the Y direction may be alternatively an acute angle or an obtuse angle.

Figure 2:
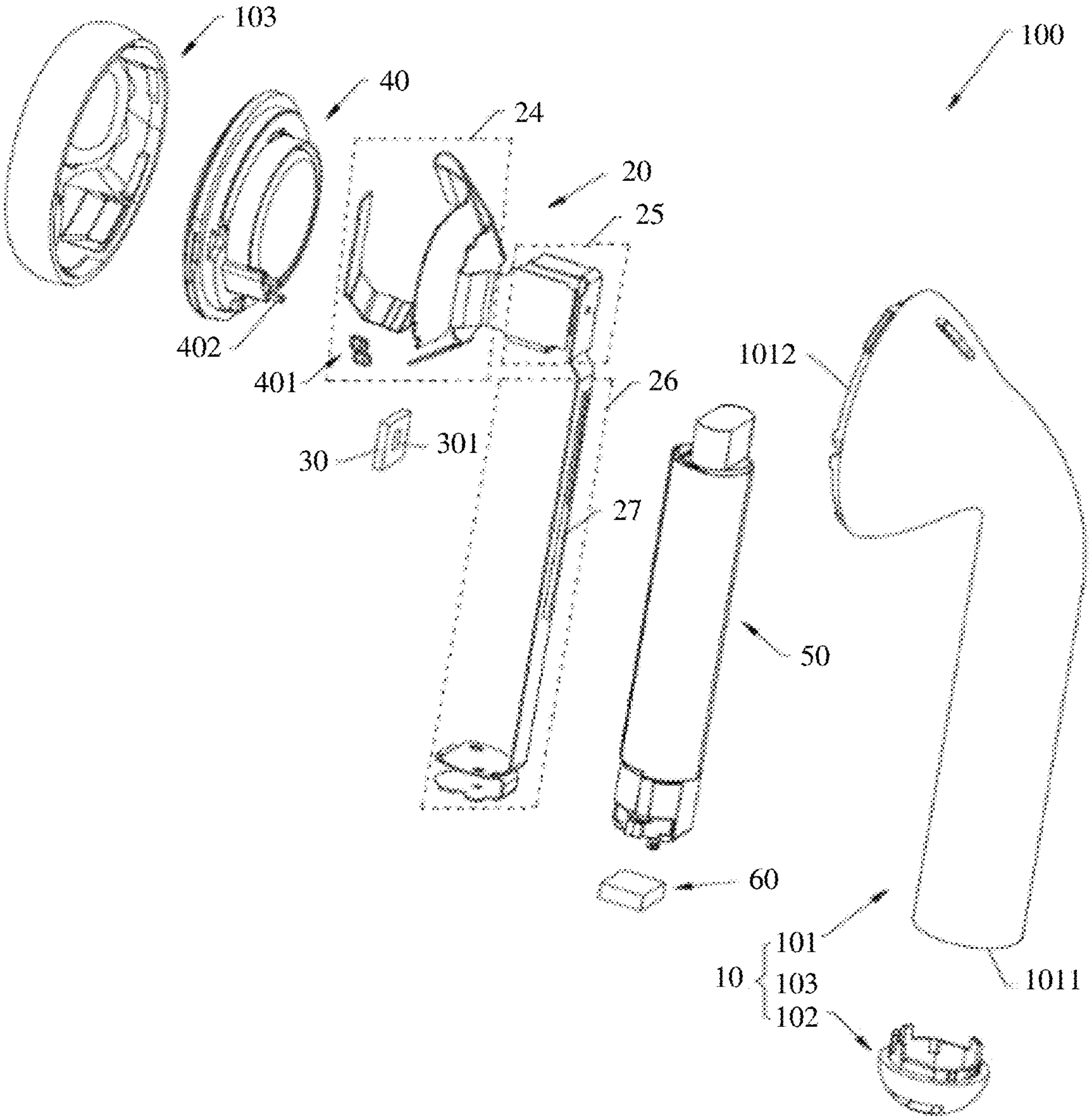
FIG. 2 is a partial schematic exploded view of the wireless earphone shown in FIG. 1.

Refer to FIG. 1 and FIG. 2 together. FIG. 2 is a partial schematic exploded view of the wireless earphone 100 shown in FIG. 1. The wireless earphone 100 includes a housing 10. The housing 10 is configured to accommodate other components of the wireless earphone 100, so as to fasten and protect the other components. The housing 10 is made of an insulating material such as plastic. The housing 10 includes a main casing 101, a bottom casing 102, and a side casing 103. The main casing 101 is located partly at the stalk portion 2 of the wireless earphone 100 and partly at the earbud portion 1 of the wireless earphone 100. On the main casing 101, a first opening 1011 is formed at a location of the bottom segment 22 of the stalk portion 2 of the wireless earphone 100, and a second opening 1012 is formed at a location of the earbud portion 1 of the wireless earphone 100. The other components of the wireless earphone 100 may be mounted into the main casing 101 from the first opening 1011 or the second opening 1012. The bottom casing 102 is located at the bottom segment 22 of the stalk portion 2 of the wireless earphone 100, and is fixedly connected to the main casing 101. The bottom casing 102 is mounted at the first opening 1011. The side casing 103 is located at the earbud portion 1 of the wireless earphone 100, and is fixedly connected to the main casing 101. The side casing 103 is mounted at the second opening 1012. After the other components of the wireless earphone 100 are mounted into the main casing 101 from the first opening 1011 or the second opening 1012, the bottom casing 102 is mounted at the first opening 101, and the side casing 103 is mounted at the second opening 1012, so that the other components of the wireless earphone 100 are enclosed in the main casing 101, thereby implementing assembly of all components of the wireless earphone 100.

A connection between the bottom casing 102 and the main casing 101 is a detachable connection (for example, a snap-fit connection or a threaded connection), to facilitate subsequent repair or maintenance of the wireless earphone 100. In another implementation, a connection between the bottom casing 102 and the main casing 101 may be alternatively a non-detachable connection (for example, bonding), to reduce a risk of accidental falling off of the bottom casing 102, so that the wireless earphone 100 is more reliable.

A connection between the side casing 103 and the main casing 101 is a detachable connection (for example, a snap-fit connection or a threaded connection), to facilitate subsequent repair or maintenance of the wireless earphone 100. In another embodiment, a connection between the side casing 103 and the main casing 101 may be alternatively a non-detachable connection (for example, bonding), to reduce a risk of accidental falling off of the side casing 103, so that the wireless earphone 100 is more reliable.

The side casing 103 is provided with one or more sound outlet holes 1031, so that sound inside the housing 10 can be transmitted to the outside of the housing 10 through the sound outlet hole 1031. A shape, location, quantity, and the like of the sound outlet hole 1031 are not strictly limited in this application.

Figure 3:
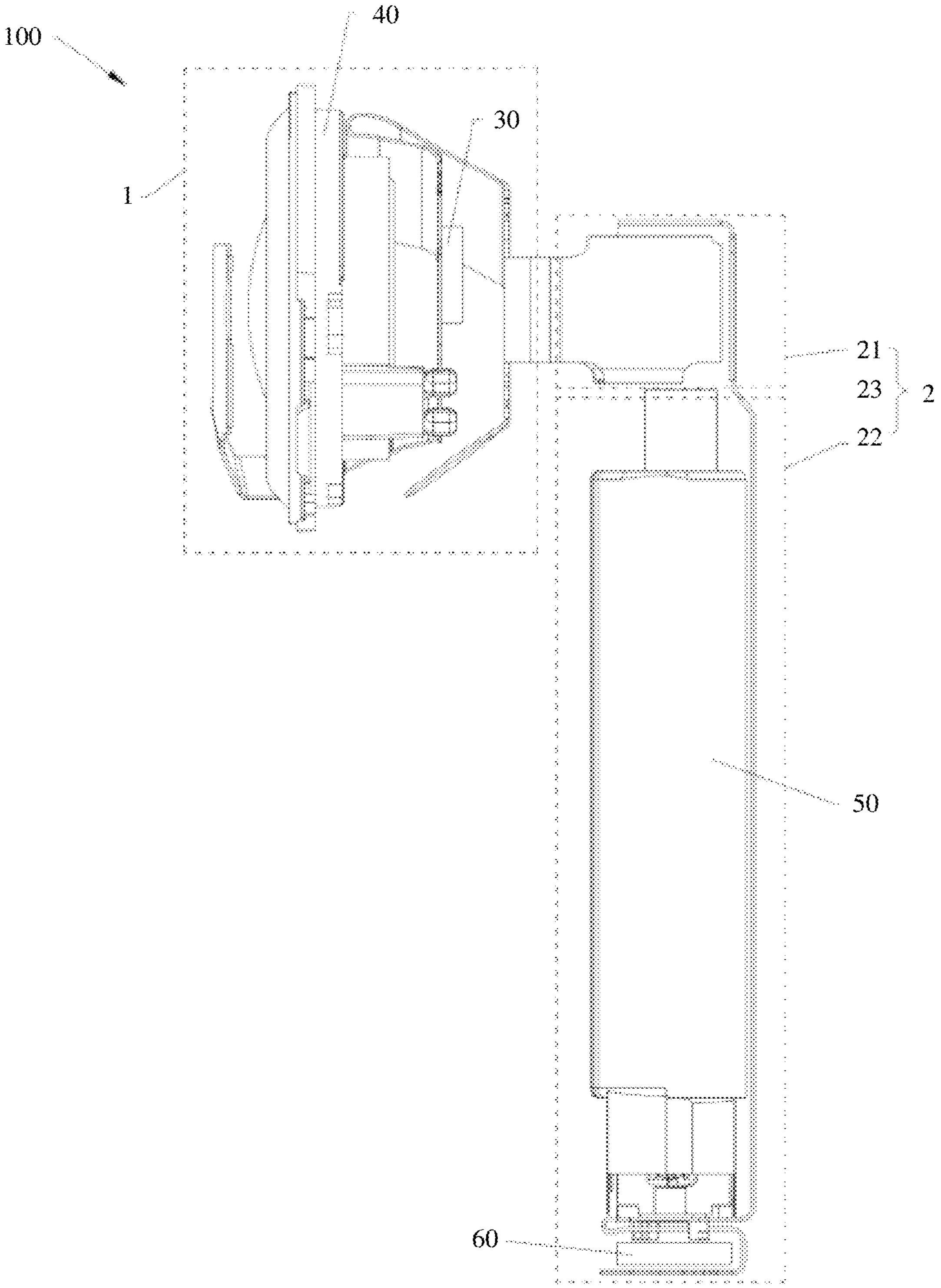
FIG. 3 is a schematic diagram of an internal structure of the wireless earphone shown in FIG. 1.

Refer to FIG. 2 and FIG. 3 together. FIG. 3 is a schematic diagram of an internal structure of the wireless earphone 100 shown in FIG. 1.

The wireless earphone 100 further includes a circuit board 20, a chip 30, a speaker module 40, and a battery 50. The speaker module 40 includes a speaker or a loudspeaker, and is configured to convert an electrical signal into a sound signal.

The circuit board 20 extends from the earbud portion 1 to the bottom segment 22 of the stalk portion 2 through the connecting segment 21 of the stalk portion 2. The circuit board 20 is configured to transmit a signal. The circuit board 20 includes a first section 24, a second section 25, and a third section 26 that are sequentially connected. The first section 24 is located at the earbud portion 1, the second section 25 is located at the connecting segment 21, and the third section 26 is located at the bottom segment 22. The circuit board 20 is configured to electrically connect structures (including the chip 30, the speaker module 40, the battery 50, and the like) inside the wireless earphone 100.

In this embodiment of this application, the circuit board 20 includes partly a rigid circuit board (printed circuit board, PCB) and partly a flexible circuit board (flexible printed circuit board, FPC) connected to the rigid circuit board. The rigid circuit board is configured to connect or bear internal components of the wireless earphone 100, so as to ensure that the internal components of the wireless earphone 100 are stably disposed in the wireless earphone 100. The flexible circuit board is configured to connect all rigid circuit boards, so as to implement an electrical connection between structures connected on the rigid circuit boards. For example, in this embodiment, the first section 24 includes a rigid circuit board, the speaker module 40 is fixedly and electrically connected to the rigid circuit board in the first section 24, and the chip 30 is borne on the rigid circuit board in the first section 24; and an end, of the third section 26, that is away from the first section includes a rigid circuit board, and the battery 50 is fixedly and electrically connected to the rigid circuit board in the third section 26. The rigid circuit boards in the first section 24 and the third section 26 are connected to each other by using the flexible circuit board, so as to implement an electrical connection between the chip 30, the speaker module 40, and the battery 50, so that the battery 50 can supply power to the chip 30 and the speaker module 40.

Optionally, in some other embodiments of this application, the circuit board 20 is a flexible circuit board, and the flexible circuit board may include one or more stiffeners (not shown in the figure). The one or more stiffeners are disposed in a stiffened region of the circuit board 20. The stiffened region of the circuit board 20 is mainly a region for connecting or bearing the internal components of the wireless earphone 100.

The chip 30 may be a common chip, or may be a system on chip (system on chip, SOC) or a system in a package (system in a package, SIP). The common chip is an independently packaged chip that has a single function, for example, a memory chip used for storage, a Bluetooth chip used for signal processing, an audio decoding chip used for audio decoding, and a sensor chip used for sensing a state of the wireless earphone. The system on chip means that functional circuits such as a storage circuit, a radio frequency front-end circuit, and an audio decoding circuit are integrated in the chip 30. The system in a package means that chips with different functions, such as a Bluetooth chip integrated with a radio frequency front-end circuit and an audio decoding chip integrated with an audio decoding circuit, are packaged in one packaging structure.

In this embodiment, the chip 30 is the system in a package. A plurality of chips with different functions are packaged in one packaging structure, so that space occupied by the chip 30 in the wireless earphone 100 can be reduced as much as possible. In addition, because the chips with different functions are packaged in one packaging structure, a quantity of rigid circuit boards in the circuit board 20 can be reduced, so that a structure of the circuit board 20 is simplified, and a mounting process of the internal structure of the wireless earphone 100 is simplified. The chip 30 is located at the earbud portion 1. The chip 30 is borne on the rigid circuit board in the first section 24, and is electrically connected to the rigid circuit board. Specifically, the chip 30 may be fastened to the circuit board 20 in a manner such as solder ball bonding or wire bonding, and is coupled to the circuit board 20. The chip 30 includes a Bluetooth chip integrated with a radio frequency front-end circuit 301. The radio frequency front-end circuit 301 is configured to process a radio frequency signal. For example, the radio frequency front-end circuit 301 is configured to modulate a radio frequency signal or demodulate a radio frequency signal. In this embodiment, with the radio frequency front-end circuit 301 of the Bluetooth chip, the wireless earphone 100 can communicate with another structure by using Bluetooth. In some other embodiments of this application, the radio frequency front-end circuit 301 of the wireless earphone may be alternatively designed as a radio frequency front-end circuit that can implement an antenna mode such as Wi-Fi or MIMO, so that the wireless earphone 100 can wirelessly communicate with another structure in a manner such as Wi-Fi or MIMO.

The speaker module 40 is disposed in the earbud portion 1. The speaker module 40 is connected to the rigid circuit board in the first section 24. The speaker module 40 is coupled to the chip 30 through the circuit board 20. The speaker module 40 is configured to convert an electrical signal into a sound signal. The speaker module 40 is located on a side, of the chip 30, that is away from the stalk portion 2. In this case, the speaker module 40 is closer to the sound outlet hole 1031 of the wireless earphone 100, and a sound signal formed by the speaker module 40 can be easily output to the outside of the wireless earphone 100 through the sound outlet hole 1031. The wireless earphone 100 may further include a fixed terminal pair 401. The fixed terminal pair 401 is located at the earbud portion 1. The fixed terminal pair 401 is fixedly connected to the circuit board 20. A connection terminal 402 of the speaker module 40 is plug-connected to the fixed terminal pair 401, to electrically connect to the circuit board 20.

The battery 50 is disposed in the bottom segment 22 of the stalk portion 2. The battery 50 is connected to the circuit board 20, and the battery 50 is coupled to the chip 30 through the circuit board 20, to supply power to the chip 30. Specifically, an end, of the battery 50, that is away from the earbud portion 1 is connected to the circuit board 20, to transmit electric energy of the battery to another structure of the wireless earphone through the circuit board 20.

In this embodiment, the battery 50 is strip-shaped, so as to be better accommodated in the main casing 101. In another embodiment, the battery 50 may be alternatively in another shape. The wireless earphone 100 may further include a microphone module 60. The microphone module 60 is located at the bottom segment 22 or the connecting segment 21 of the stalk portion 2. The microphone module 60 may be located on a side, of the battery 50, that is away from the earbud portion 1, or may be located on a side, of the battery 50, closer to the earbud portion 1. The microphone module 60, the speaker module 40, the chip 30, and the battery 50 are all connected to the circuit board 20. In other words, the microphone module 60 is electrically connected to the battery 50 through the circuit board 20, so that the battery 50 can charge the microphone module 60 through the circuit board 20. The microphone module 60 can also be coupled to the chip 30 through the circuit board 20.

The microphone module 60 includes a microphone. The microphone module 60 is configured to convert a sound signal into an electrical signal, and the electrical signal obtained through conversion can be transmitted to the chip 30 through the circuit board 20.

Figure 3A:
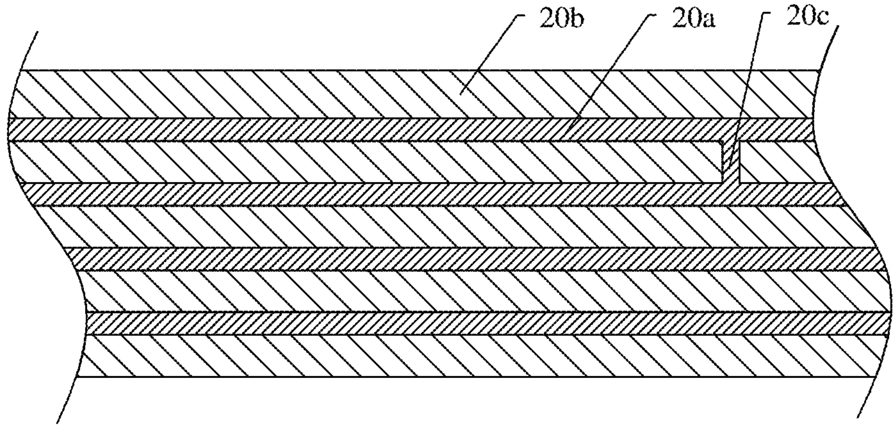
FIG. 3*a* is a partial cross-sectional schematic view of a circuit board shown in FIG. 2.
Figure 3B:
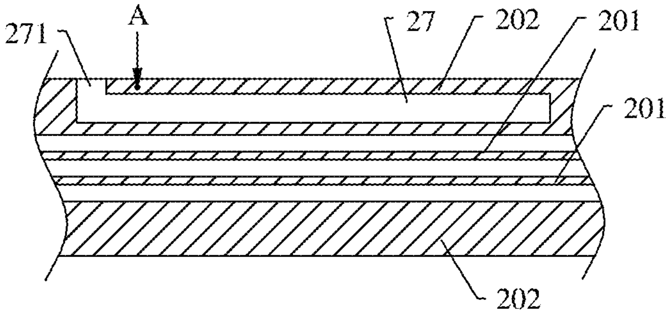
FIG. 3*b* is a schematic diagram of a structure of a conducting layer in FIG. 3*a;*
Figure 3C:
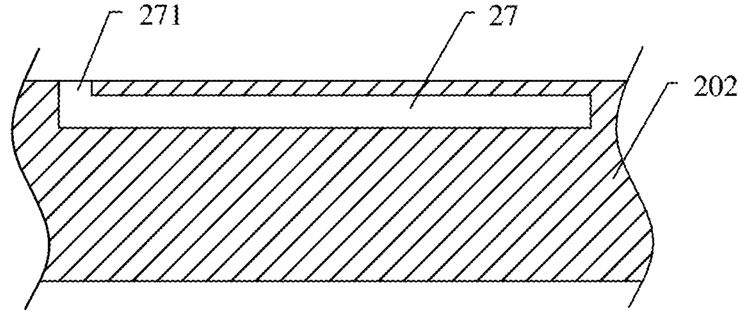
FIG. 3*c* is a schematic diagram of a structure of another conducting layer in FIG. 3*a;*

Refer to FIG. 3*a*, FIG. 3*b*, and FIG. 3*c*. FIG. 3*a* is a partial cross-sectional schematic view of the circuit board 20 shown in FIG. 2. FIG. 3*b* is a schematic diagram of a structure of a conducting layer 20*a* in FIG. 3*a*. FIG. 3*c* is a schematic diagram of a structure of another conducting layer 20*a* in FIG. 3*a*. The circuit board 20 includes a plurality of conducting layers 20*a* disposed in a stacked manner and a medium layer 20*b* disposed between adjacent conducting layers 20*a*. Each conducting layer 20*a* includes a printed circuit pattern formed by an electrical conductor. In some implementations, the rigid circuit board of the circuit board 20 includes a via hole 23. The via hole 23 can connect printed circuit patterns of different conducting layers 20*a*, to implement an electrical connection between the conducting layers 20*a*. The printed circuit pattern formed by the electrical conductor partly forms a conductive trace 201, and partly forms a reference ground 202 of the circuit board 20. The conductive trace 201 is configured to transmit a signal or electric energy. The reference ground 202 is grounded, and is configured to provide a reference level. In this embodiment, the electrical conductor is a metal, and the formed conductive trace is a metal trace.

In some embodiments, referring to FIG. 3*c*, one conducting layer 20*a* included in the circuit board 20 is a reference ground layer. To be specific, a printed circuit pattern formed by an electrical conductor is laid on the entire conducting layer 20*a* to form a reference ground 202, and the conducting layer 20*a* is grounded, thereby forming the reference ground layer. In some embodiments, referring to FIG. 3*b*, the conducting layer 20*a* includes a metal trace 201 and a reference ground 202. In some embodiments, reference grounds 202 are disposed on different conducting layers 20*a*, and the reference grounds on the different conducting layers 20*a* are electrically connected through a via hole 20C, thereby forming a reference ground network in the circuit board 20.

Figure 4:
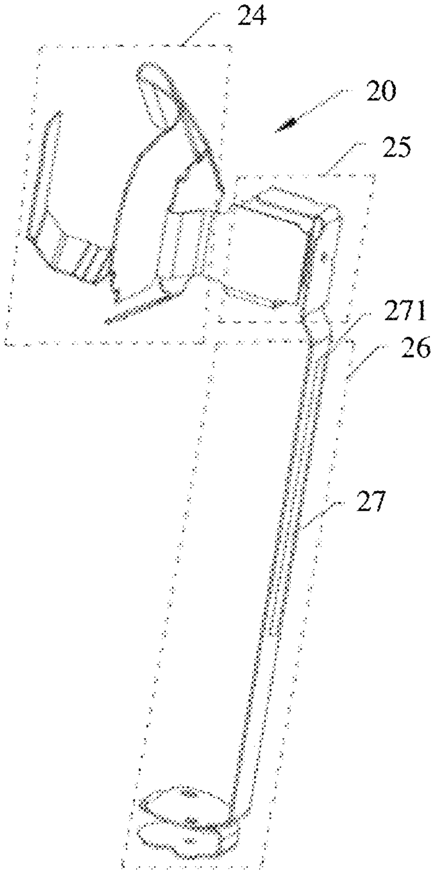
FIG. 4 is a schematic diagram of a structure of a circuit board shown in FIG. 2.

Refer to FIG. 4, FIG. 3*b*, and FIG. 3*c* together. FIG. 4 is a schematic diagram of a structure of the circuit board 20 in the embodiment shown in FIG. 2. In this embodiment of this application, a slot 27 is disposed on the reference ground 202, so that the reference ground 202 with the slot 27 is formed, thereby forming a radiator of a slot antenna. The slot antenna is a first antenna of the wireless earphone 100. The slot 27 is located at the stalk portion 2, and the slot 27 extends along the length direction of the stalk portion 2. Optionally, the slot 27 is located at the bottom segment 22 of the stalk portion 2, that is, the slot 27 is formed on the third section 26 of the circuit board 20. In this embodiment, starting from a location at which the connecting segment 21 is connected to the bottom segment 22, the slot 27 is formed. The slot 27 is a linear slot. An extension direction of the slot 27 is parallel to an axis direction of the battery 50 (that is, the Z direction in FIG. 1). It may be understood that, in some embodiments, the slot 27 may alternatively extend around an axis direction of the battery 50. Alternatively, the slot 27 may extend from the connecting segment 21 of the stalk portion to the bottom segment 22, that is, the slot 27 is located partly at the connecting segment 21 and partly at the bottom segment 22.

It should be noted that, in this embodiment of this application, when the slot 27 is disposed on any conducting layer 20*a* of the circuit board 20 to form the radiator of the slot antenna, the slot 27 is also formed at a location that corresponds to the slot 27 and that is on another conducting layer 20*a* in a thickness direction of the circuit board 20. In this way, clearance of the slot antenna is ensured, so that the slot antenna has good performance. For example, it can be seen from FIG. 3*b* and FIG. 3*c* that the slot 27 is formed on all the different conducting layers 20*a* of the circuit board 20. In this embodiment, the third section 26 is located between the battery 50 and the housing 10, and the third section 26 is configured to connect the battery 50, the chip 30, and the speaker module 40. To ensure clearance of the slot antenna, a distance between the circuit board 20 and the battery 50 is at least greater than 0.1 mm. The distance between the circuit board 20 and the battery 50 is a distance from the circuit board 20 to a metal housing of the battery 50. In some embodiments, an insulating cement material layer may be disposed between the circuit board 20 and the metal housing of the battery 20, to use the insulating material layer to achieve stability of the circuit board 20 relative to the battery 50 and ensure a specific gap between the circuit board 20 and the battery 50.

An antenna of the wireless earphone 100 in this embodiment of this application is the slot antenna, and the slot antenna is characterized by an ultra-low profile. Therefore, the distance between the circuit board 20 and the battery 50 may be comparatively short, so that space occupied by the antenna in the wireless earphone 100 can be reduced.

In this embodiment of this application, the slot 27 is disposed on the reference ground 202 of the circuit board 20, to form the slot antenna. In other words, in this embodiment of this application, the antenna of the wireless earphone 100 and the circuit board 20 in the wireless earphone 100 are integrated. This can prevent the antenna in the wireless earphone 100 from occupying internal space of the wireless earphone 100. In addition, in this embodiment, the antenna applicable to the wireless earphone 100 can be obtained by disposing the slot 27 on the circuit board 100, so that a structure is simple. This can simplify an internal structure of the wireless earphone 100, and simplify an assembly technique of the wireless earphone 100.

In this embodiment, a length of the slot 27 is a ¼ wavelength. An opening 271 is disposed at one end of the slot 27, so as to meet a boundary condition of the slot antenna whose length is the ¼ wavelength, thereby ensuring that the slot antenna can have comparatively good radiation performance. It should be noted that each ¼ wavelength in this application is a quarter of a wavelength corresponding to an operating frequency band of the antenna, each ⅛ wavelength in this application is one eighth of the wavelength corresponding to the operating frequency band of the antenna, and each 1/20 wavelength in this application is one twentieth of the wavelength corresponding to the operating frequency band of the antenna. For example, that the length of the slot 27 is the ¼ wavelength in this embodiment means that the length of the slot 27 is a quarter of the wavelength corresponding to the operating frequency band of the slot antenna. In this embodiment, the operating frequency band generated through resonance of a radiation part of the slot antenna is a Bluetooth frequency band (approximately 2.4 GHz), to implement Bluetooth communication of the wireless antenna 100. Therefore, in this embodiment, the length of the slot 27 is approximately 20 mm, which is a quarter of a wavelength corresponding to the Bluetooth frequency band. A width of the slot 27 is as large as possible under width limitation of the reference ground 202, but is far smaller than the length of the slot 27. Optionally, the width of the slot 27 may be approximately 0.5 mm. A length direction of the slot 27 is the extension direction of the slot 27 on the circuit board 20 (the Z direction in FIG. 1), and a width direction of the slot 27 is perpendicular to the length direction. It may be understood that the wireless earphone may alternatively communicate with another structure by using another antenna mode such as Wi-Fi. When the wireless earphone communicates with another structure by using another antenna mode such as Wi-Fi, the length of the slot 27 needs to be correspondingly changed. For example, when the wireless earphone communicates with another structure by using Wi-Fi, the length of the slot 27 is approximately a quarter of an operating wavelength of a Wi-Fi frequency band. It may be understood that, in some embodiments, the length of the slot 27 may be alternatively ½ of the wavelength corresponding to the operating frequency band of the slot antenna. In this case, the opening 271 does not need to be disposed at one end of the slot 27, that is, the slot 27 is a structure whose two ends are closed, so as to ensure that the slot antenna can have comparatively good radiation performance.

The slot antenna further includes a feed point A. In this embodiment, a microstrip is disposed on the circuit board 20. One end of the microstrip is electrically connected to the radio frequency front-end circuit of the chip 30, and the other end of the microstrip extends to the feed point A of the slot antenna. In this way, the radio frequency front-end circuit can feed a radio frequency signal into the radiator of the slot antenna from the feed point A, and the radiator of the slot antenna can also feed a received radio frequency signal into the radio frequency front-end circuit through the feed point A. In this embodiment of this application, the microstrip connecting the radio frequency front-end circuit and the feed point A of the slot antenna may be replaced with another signal cable. For example, the signal cable may be alternatively a coaxial line, a strip line, or a common metal trace.

The feed point A may be located on the reference ground 202 and close to an edge of the slot 27. Optionally, a distance between a location of the feed point A and an end, of the slot 27, far away from the opening 271 may be approximately the ½ wavelength. When the feed point A is located at the location, an antenna impedance may be closer to 50Ω, thereby achieving a better antenna effect.

In this embodiment, the slot 27 is disposed on the third section 26 of the circuit board 20, the length of the slot 27 is approximately the ¼ wavelength, and generally, an electrical length of the third section 26 is approximately the ¼ wavelength. A current generated by the circuit board through excitation by the slot antenna 27 is concentrated mainly on two sides of the slot, and a current generated through excitation at another location is comparatively small. Therefore, a length at a location, other than that of the slot 27, on the third section 26 has comparatively slight impact on the slot antenna. Therefore, a length at a location, other than that of the slot 27, on the circuit board 20 may be correspondingly changed based on an actual requirement. For example, the electrical length of the third section 26 may be slightly greater than the ¼ wavelength, to ensure that one end of the third section 26 can be connected to the battery, and the other end of the third section 26 is connected to the second section 25. A sum of electrical lengths of the first section 24 and the second section 25 of the circuit board 20 is approximately the ¼ wavelength or greater than the ¼ wavelength, so that a ½ wavelength mode generated by the circuit board 20 can be excited, thereby achieving comparatively high radiation efficiency. For example, an electrical length of the second section 25 may be 0, and an electrical length of the first section 24 may be the ¼ wavelength; or each of an electrical length of the second section 25 and an electrical length of the first section 24 may be the ⅛ wavelength; or each of an electrical length of the second section 25 and an electrical length of the first section 24 may be the ¼ wavelength.

Figure 4A:
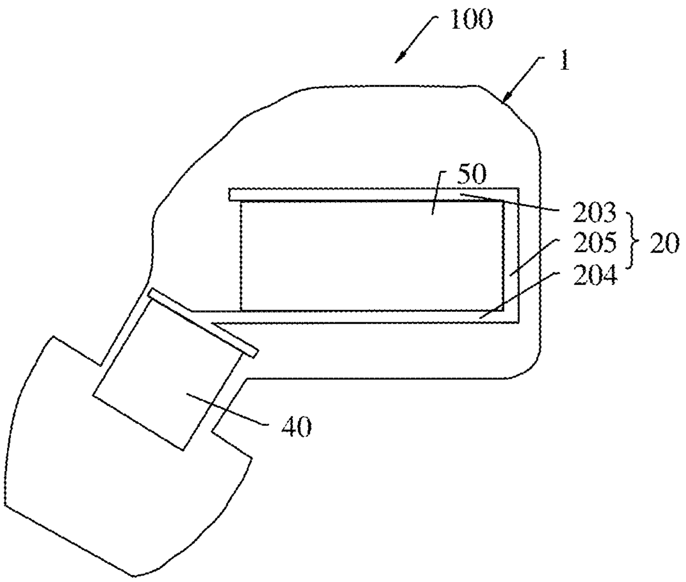
FIG. 4*a* is a schematic diagram of an internal structure of a wireless earphone according to another embodiment of this application.

It may be understood that, in some embodiments, the wireless earphone may not include the stalk portion 2. FIG. 4*a* is a schematic diagram of a structure of a wireless earphone 100 according to another embodiment of this application. In this embodiment, the wireless earphone 100 includes only an earbud portion 1. A speaker module 40, a battery 50, a circuit board 20, and a slot antenna are all disposed in the earbud portion 1. The circuit board 20 is electrically connected to the speaker module 40 and the battery 50. The circuit board 20 includes a reference ground, and a slot is disposed on the reference ground to form a radiator of the slot antenna. In this embodiment of this application, the wireless earphone does not include a stalk portion 2, and can also be implemented on the circuit board 20 configured to connect the speaker module 40 and the battery 50. In other words, an antenna of the wireless earphone 100 and the circuit board in the wireless earphone 100 are integrated. This can prevent the antenna in the wireless earphone 100 from occupying internal space of the wireless earphone 100. In addition, the antenna applicable to the wireless earphone can be obtained by disposing the slot on the circuit board 20, so that a structure is simple. This can simplify an internal structure of the wireless earphone 100, and simplify an assembly technique of the wireless earphone 100.

Figure 4B:
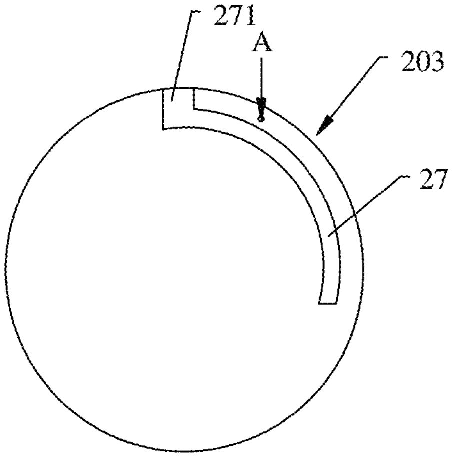
FIG. 4*b* is a schematic diagram of a structure of a first circuit board in the embodiment shown in FIG. 4*a;*

In this embodiment, the circuit board 20 includes a first circuit board 203 and a second circuit board 204 that are located on two opposite sides of the battery 50, and a third circuit board 205 that is connected between the first circuit board 203 and the second circuit board 204. An end, of the second circuit board 204, that is away from the third circuit board 205 is electrically connected to the speaker module 40. Refer to FIG. 4*a* and FIG. 4*b* together. FIG. 4*b* is a schematic diagram of a structure of the first circuit board 203 in the embodiment shown in FIG. 4*a*. In this embodiment, a slot 27 is disposed on a reference ground of the first circuit board 203, to form the radiator of the slot antenna. A feed point A of the slot antenna is located at a periphery of the slot 27. In this implementation, an opening 271 is disposed at one end of the slot 27, to adjust antenna performance of the slot antenna. Internal space of the wireless earphone 100 in this embodiment is comparatively small, and therefore, an electrical length of the slot 27 is approximately a ⅛ wavelength, to adapt to a size of the wireless earphone 100 in this embodiment. In this embodiment, the slot antenna further includes a matching element such as a capacitor or an inductor. The matching element is connected between a radio frequency front-end circuit and the feed point A of the slot antenna, to adjust an impedance of the slot antenna, thereby obtaining comparatively good antenna performance.

Figure 5:
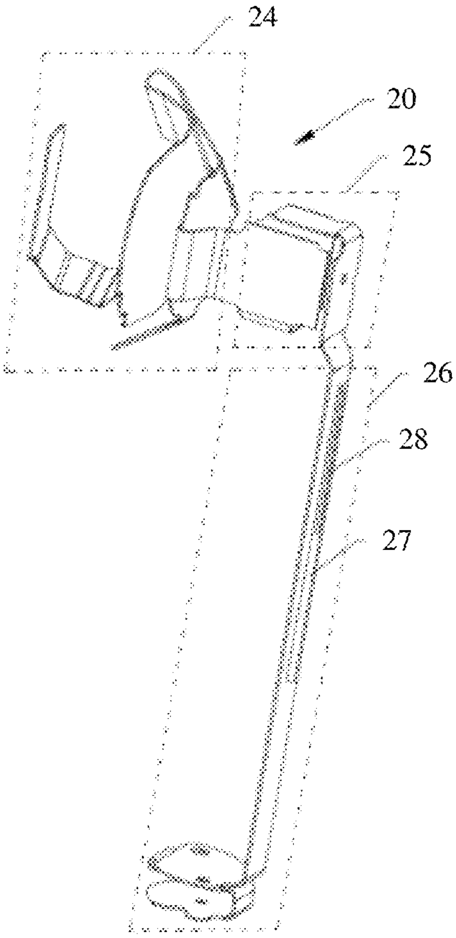
FIG. 5 is a schematic diagram of a structure of a circuit board according to another embodiment of this application.
Figure 6:
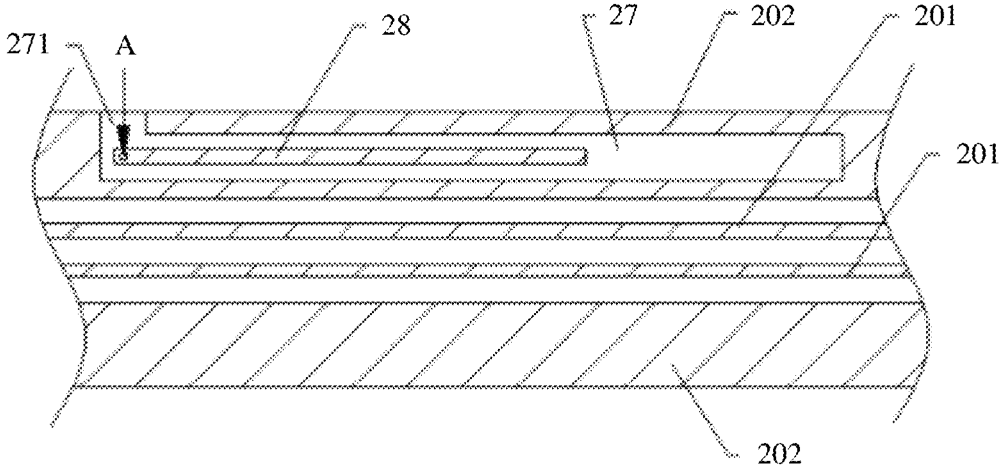
FIG. 6 is a schematic diagram of a structure of a conducting layer of the circuit board shown in FIG. 5.

Refer to FIG. 5 and FIG. 6. FIG. 5 is a schematic diagram of a structure of a circuit board 20 according to another embodiment of this application. FIG. 6 is a schematic diagram of a structure of a conducting layer 20*a* of the circuit board 20 in FIG. 5. A difference between this embodiment of this application and the embodiment shown in FIG. 3*a* lies in that a slot antenna further includes a coupling stub 28, and a feed point A is located on the coupling stub 28. The coupling stub 28 is disposed in a slot 27, and is configured to adjust an impedance of the slot antenna to be close to 50Ω, so that the slot antenna can have comparatively good radiation performance. The coupling stub 28 may be a straight line or curve extending along the slot 27. The feed point A is located at an end, of the coupling stub 28, closer to an earbud portion 1, so as to reduce a transmission distance of a radio frequency signal and reduce a loss of the radio frequency signal on a transmission path.

In some embodiments, the coupling stub 28 may be a conducting wire of a microstrip configured to transmit a radio frequency signal. Specifically, the microstrip includes a transmission portion and a coupling portion connected to the transmission portion. An end of the transmission portion facing away from the coupling portion is connected to a radio frequency front-end circuit, and the coupling portion extends in the slot 27 to form the coupling stub 28. It should be noted that, at a location that corresponds to the transmission portion of the microstrip and that is on another conducting layer 20*a* in a thickness direction of the circuit board 20, there is an electrical conductor, and no clearance is needed. However, at a location that corresponds to the coupling portion of the microstrip and that is on the another conducting layer 20*a* in the thickness direction of the circuit board 20, there shall be no electrical conductor, and a clearance is needed.

Figure 7:
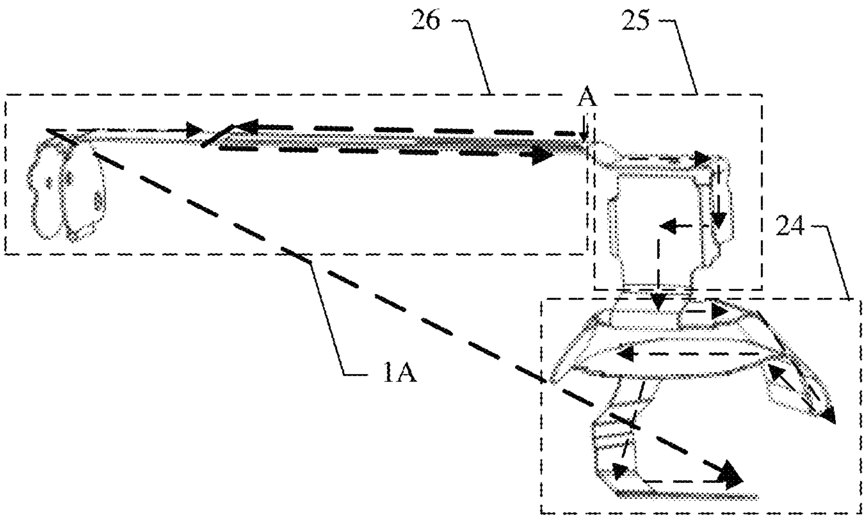
FIG. 7 shows an antenna current direction, on the circuit board, of a slot antenna of a wireless earphone in the embodiment shown in FIG. 5.

The slot is disposed on the circuit board to form the slot antenna, and the slot antenna can excite the circuit board 20 to generate a first equivalent current. In this embodiment of this application, the slot antenna is in a ¼-wavelength slot mode. FIG. 7 shows an antenna current direction, on the circuit board 20, of the slot antenna of a wireless earphone 100 in the embodiment shown in FIG. 5. A ground current of the slot antenna is located mainly on the circuit board 20 (that is, a third section 26) in a stalk portion 2. An antenna current is concentrated mainly on two sides of the slot 27. A part of the antenna current is from the feed point A of a slot current to an end, of an extreme end (a first section 24) of the circuit board 20 in the earbud portion 1, that is away from the stalk portion 2. Therefore, based on the current direction, it can be learned that a differential mode can be generated through excitation by disposing the slot 27 on the circuit board 20 to form the slot antenna. The antenna current and the ground current can be combined to obtain the first equivalent current 1A in a resonant mode. A direction of the first equivalent current 1A is mainly a direction from an end, of the third section 26, that is away from the earbud portion 1 to the end, of the first section 24, that is away from the stalk portion 2.

Figure 8:
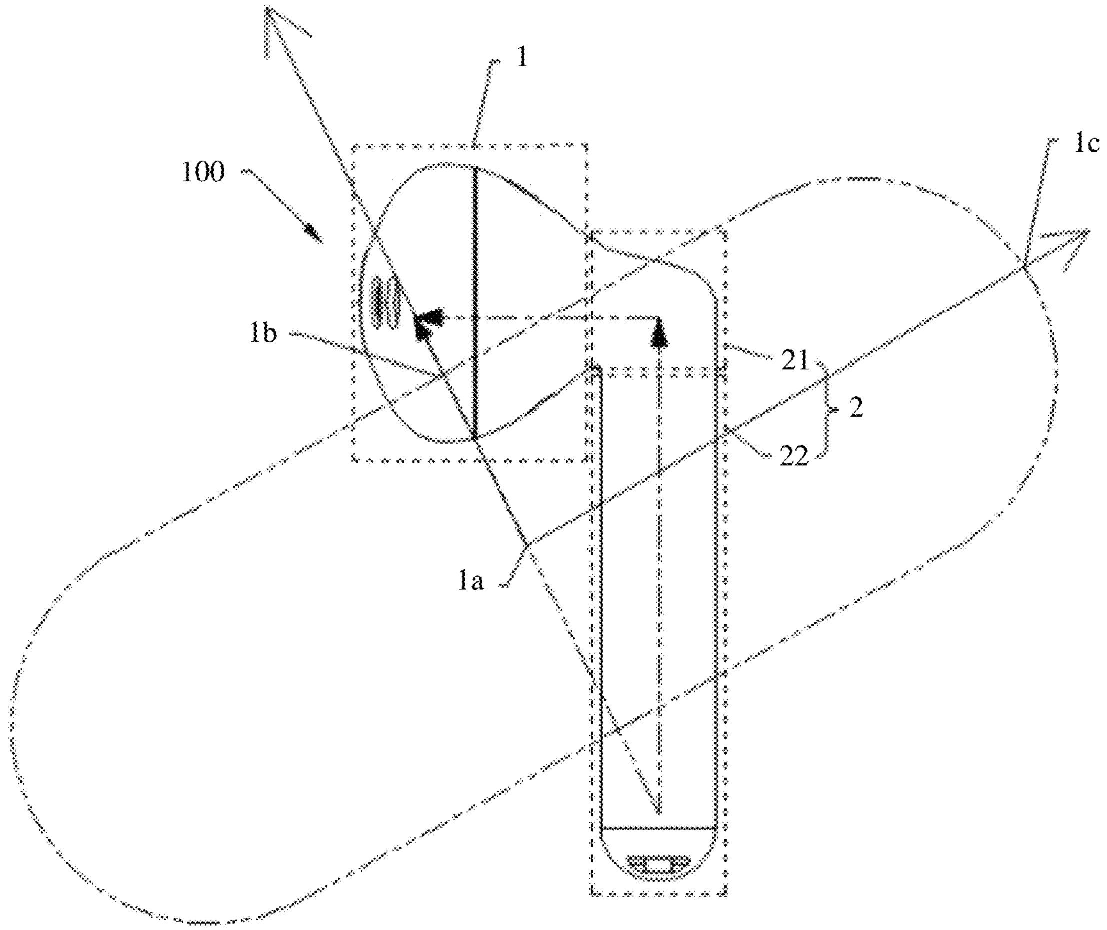
FIG. 8 is a schematic diagram of a radiation field pattern of a slot antenna of a wireless earphone in the embodiment shown in FIG. 5.
Figure 9:
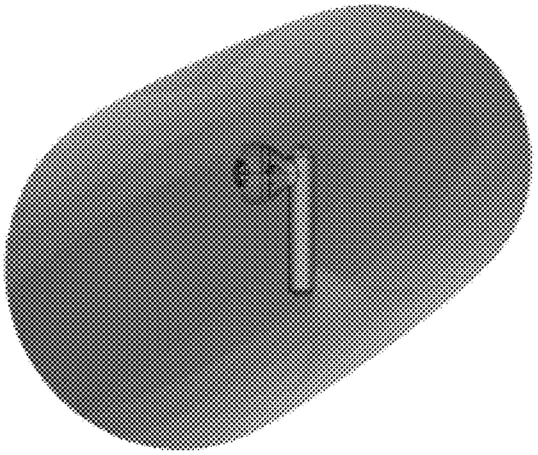
FIG. 9 is a simulation diagram of a radiation field pattern of a slot antenna of a wireless earphone in the embodiment shown in FIG. 5.

Refer to FIG. 8 and FIG. 9. FIG. 8 is a schematic diagram of a radiation field pattern of the slot antenna of the wireless earphone 100 shown in FIG. 5. FIG. 9 is a simulation diagram of the radiation field pattern of the slot antenna of the wireless earphone 100 shown in FIG. 5.

As shown in FIG. 8 and FIG. 9, a direction of the first equivalent current 1A of the slot antenna of the wireless earphone 100 is a direction from an end, of the earbud portion 1 of the wireless earphone 100, that is away from the stalk portion 2 to an end, of the stalk portion 2, that is away from the earbud portion 1. A connection line between a center 1*a* of the radiation field pattern and a radiation zero point 1*b* is parallel to the direction of the first equivalent current 1A, and a connection line between the center is of the radiation field pattern and a radiation intense point 1*c* is perpendicular to the direction of the first equivalent current 1A.

Figure 10:
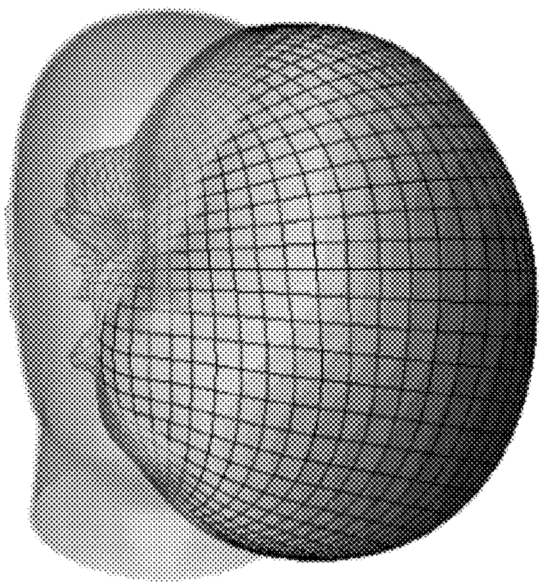
FIG. 10 is a head-phantom radiation pattern of a slot antenna of a wireless earphone in the embodiment shown in FIG. 5.
Figure 11:
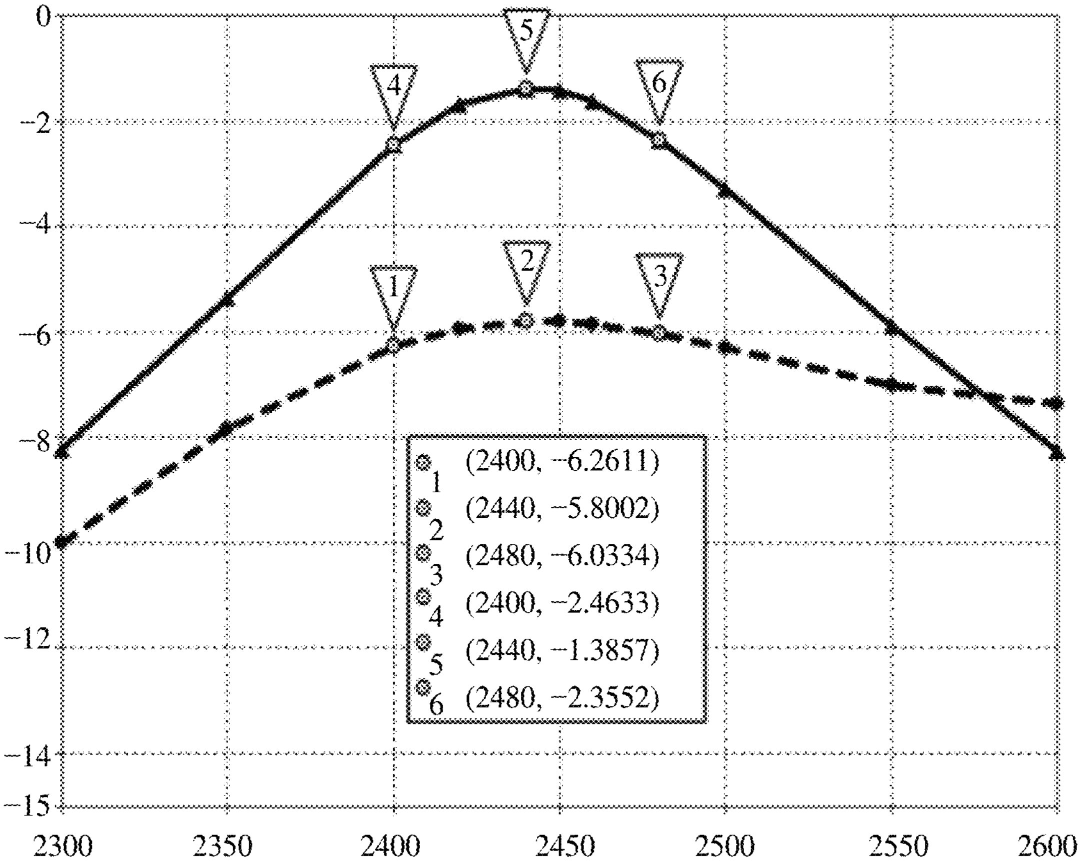
FIG. 11 is an efficiency comparison diagram of a slot antenna of a wireless earphone in the embodiment shown in FIG. 5, in different use environments.

Refer to FIG. 10 and FIG. 11. FIG. 10 is a head-phantom radiation pattern of the slot antenna of the wireless earphone wo shown in FIG. 5. FIG. 11 is an efficiency comparison diagram of the slot antenna of the wireless earphone wo shown in FIG. 5, in different use environments. A solid-line curve in FIG. 11 represents antenna efficiency when the wireless earphone 100 is not worn, that is, antenna efficiency when the wireless earphone 100 is in an initial state. A dashed-line curve in FIG. 11 represents antenna efficiency when the wireless earphone 100 is worn on a head of a user. In FIG. 11, a horizontal coordinate represents frequency measured in megahertz (MHz), and a vertical coordinate represents efficiency measured in decibels (dB).

It can be learned from FIG. 11 that, when the free-space antenna efficiency of the slot antenna of the wireless earphone 100 is approximately −2 dB, and the head-phantom antenna efficiency is approximately −6 dB, antenna efficiency of the slot antenna is higher than antenna efficiency (approximately −13 dB) of a commonly used wireless earphone antenna.

To sum up, in the wireless earphone 100 shown in this embodiment of this application, the slot antenna is obtained by disposing the slot on the circuit board 20 configured to implement an electrical connection of an internal structure of the wireless earphone 100, so that the antenna of the wireless earphone wo does not need to additionally occupy internal space of the wireless earphone 100. Moreover, the internal structure of the wireless earphone 100 is simplified, an assembly process is simplified, and production costs are reduced. In addition, in this embodiment of this application, the slot antenna of the wireless earphone wo has comparatively high antenna efficiency, which meets a wireless communication requirement of the wireless earphone 100.

Figure 12:
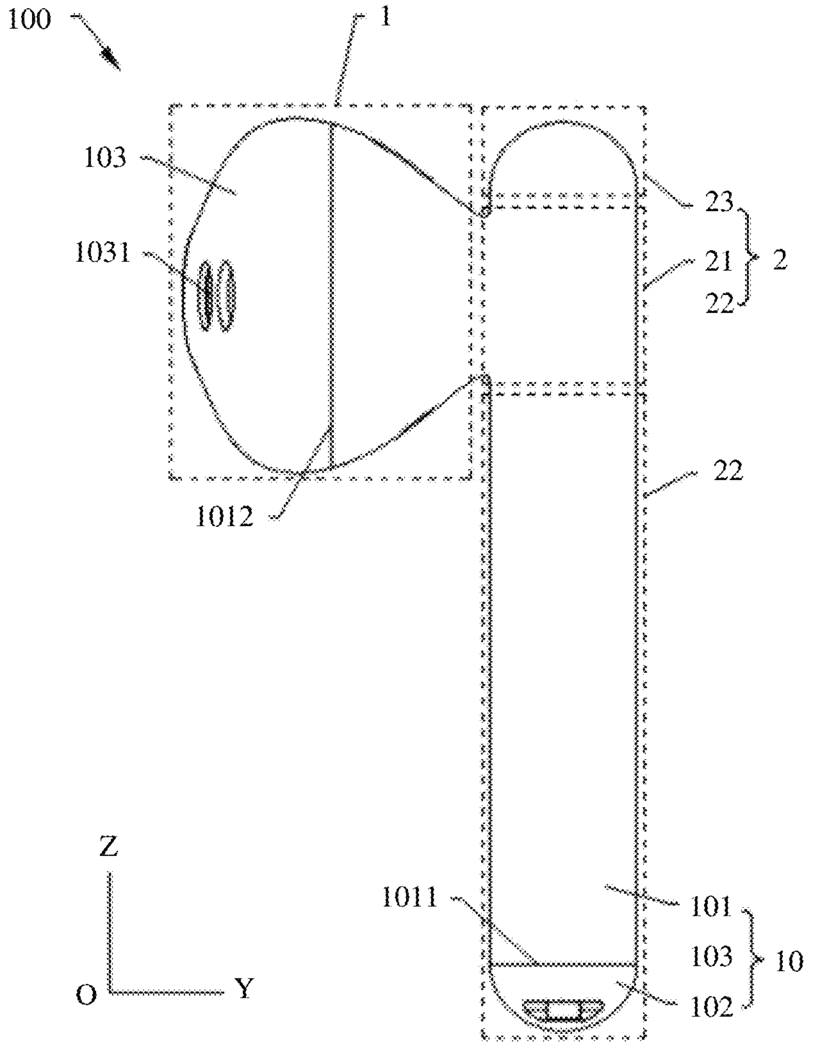
FIG. 12 is a schematic diagram of a structure of a wireless earphone according to another embodiment of this application.
Figure 13:
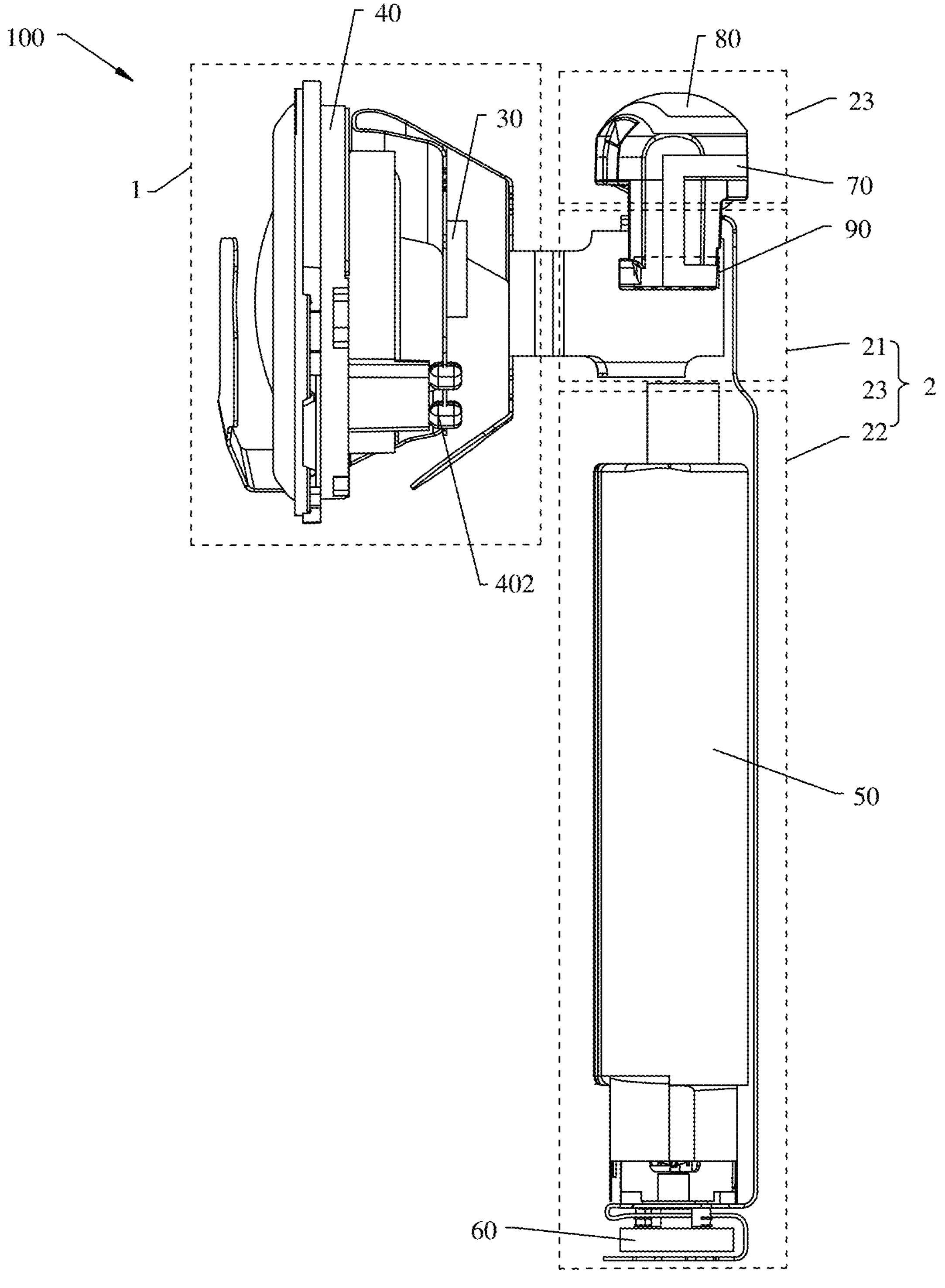
FIG. 13 is a schematic diagram of an internal structure of the wireless earphone in the embodiment shown in FIG. 12.
Figure 13A:
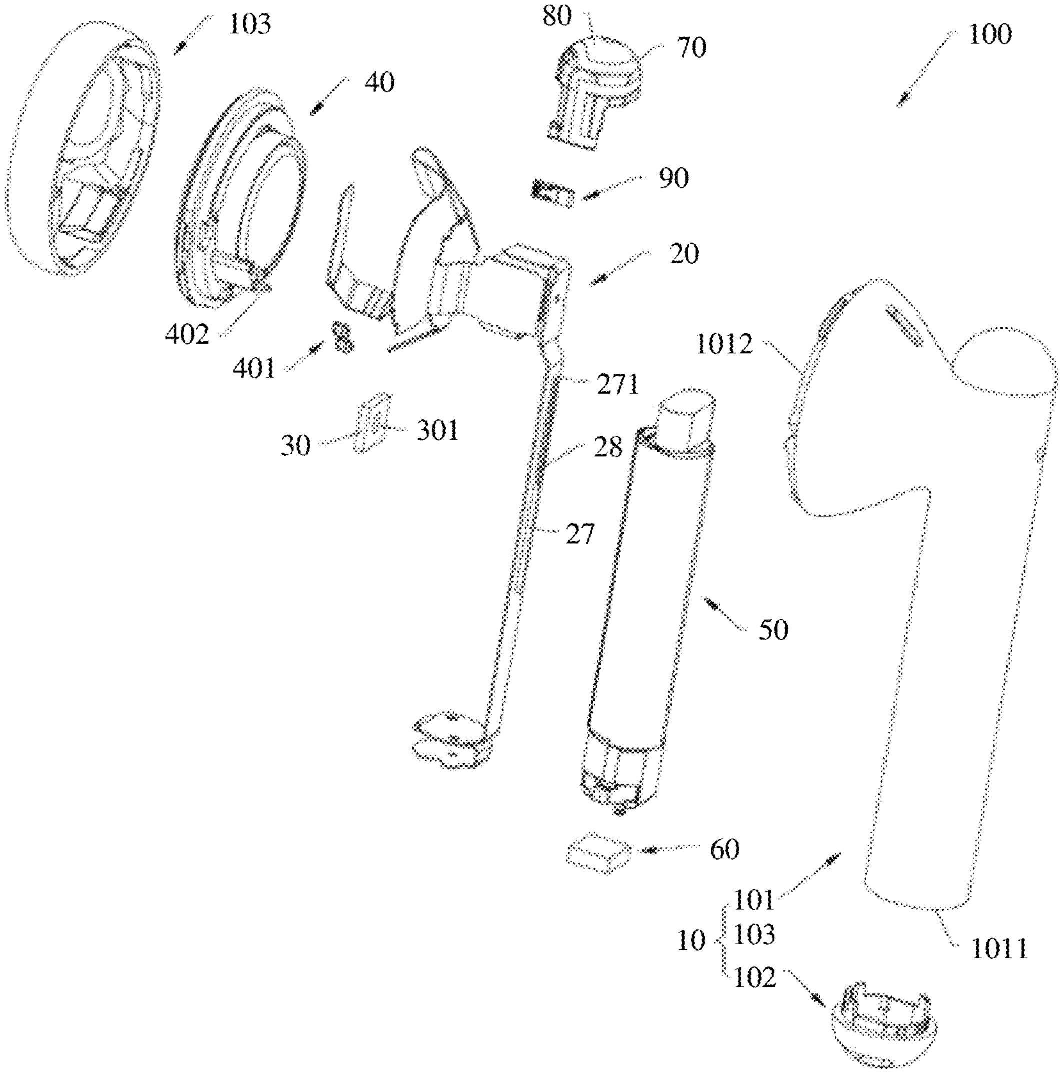
FIG. 13*a* is a partial schematic exploded view of the wireless earphone in the embodiment shown in FIG. 12.

This application further provides another wireless earphone. Refer to FIG. 12, FIG. 13, and FIG. 13*a*. FIG. 12 is a schematic diagram of a structure of a wireless earphone 100 according to another embodiment of this application. FIG. 13 is a schematic diagram of an internal structure of the wireless earphone 100 in the embodiment shown in FIG. 12. FIG. 13*a* is a partial schematic exploded view of the wireless earphone 100 in the embodiment shown in FIG. 12. A difference between this embodiment and the embodiment shown in FIG. 5 lies in that a stalk portion 2 of the wireless earphone 100 in this embodiment further includes a top segment 23 located on a side of a connecting segment 21 facing away from a bottom segment 22, and antennas of the wireless earphone 100 further include a second antenna 70. The second antenna 70 is located in the top segment 23 of the stalk portion 2.

In this embodiment, the second antenna 70 includes a radiator that extends from the connecting segment 21 of the stalk portion 2 to the top segment 23 of the stalk portion 2. Optionally, the second antenna 70 may be a monopole antenna, an inverted F antenna (inverted F-shaped antenna, IFA), or the like. Optionally, an antenna 20 may be a ceramic antenna, a circuit board antenna, a steel sheet antenna, a laser direct structured (laser direct structuring, LDS) antenna, an in-mold injection molded antenna, or the like.

In this embodiment, the second antenna 70 is a laser direct structured antenna. Specifically, the wireless earphone 100 further includes an antenna support 80. The antenna support 80 extends from the connecting segment 21 of the stalk portion 2 to the top segment 23 of the stalk portion 2. The antenna support 80 is configured to fasten and support the second antenna 70. The second antenna 70 is formed on the antenna support 80 through a laser direct structuring process, to obtain the laser direct structured antenna. In another embodiment, alternatively, the second antenna 70 may be fastened to the antenna support 80 through assembly. For example, the second antenna 70 is welded or bonded to the antenna support 80. In this embodiment, an equivalent electrical length of the second antenna 70 is a ¼ wavelength.

In some embodiments, the radiator of the second antenna 70 can be disposed around the antenna support 80, so as to ensure an electrical length of the radiator of the second antenna 70, and reduce a size of internal space, of the wireless earphone 100, occupied by the second antenna 70.

Optionally, a material of the antenna support 80 may be ceramic. In this case, because a dielectric constant of ceramic is comparatively high, a size of the second antenna 70 can be effectively reduced. In another embodiment, a material of the antenna support 80 may be alternatively plastic.

Optionally, the wireless earphone 100 further includes a conductive part 90. The conductive part 90 is located in the connecting segment 21 of the stalk portion 2. The conductive part 90 is configured to connect a signal cable for transmitting a radio frequency signal on a circuit board 20, and the second antenna 70 located on the antenna support 80. In other words, one end of the conductive part 90 is connected to the signal cable that is on the circuit board 20 and that is configured to transmit a radio frequency signal, and the other end of the conductive part 90 is connected to the second antenna 70. A location at which the conductive part 90 is connected to the circuit board 20 is close to an earbud portion 1. To be specific, the conductive part 90 is connected to an end, of a second section 25 of the circuit board 20, closer to a first section 24. In this implementation, the signal cable that is on the circuit board 20 and that is configured to transmit a radio frequency signal is a microstrip formed on the circuit board 20, and the conductive part 90 is a spring. In another embodiment, the signal cable that is on the circuit board 20 and that is configured to transmit a radio frequency signal may be alternatively another structure, such as a strip line, a coaxial line, or a common metal trace. The conductive part 90 may be alternatively another structure, for example, a conductive adhesive. In another embodiment, alternatively, the conductive part 90 may be replaced with a capacitor, and the circuit board 20 is coupled to the second antenna 70 by using the capacitor.

Figure 14:
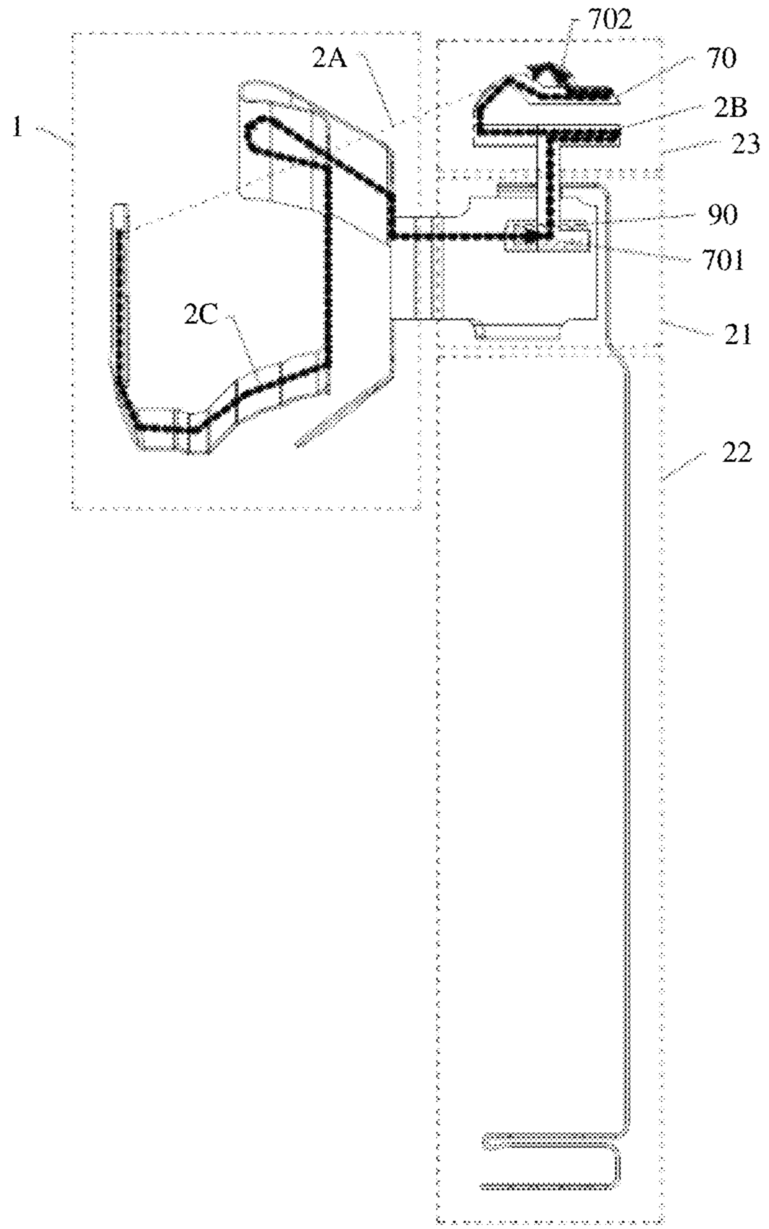
FIG. 14 is a schematic diagram of a direction of a current generated through excitation by a second antenna of the wireless earphone in the embodiment shown in FIG. 12.

In this embodiment of this application, the second antenna 70 can excite the circuit board 20 to generate a second equivalent current. A direction of the second equivalent current intersects a direction of a first equivalent current. FIG. 14 is a schematic diagram of the direction of the current generated through excitation by the second antenna of the wireless earphone 100 in the embodiment shown in FIG. 12. Optionally, the second antenna 70 includes a feeding end 701 and an extreme end 702 far away from the feeding end 701. The conductive part 90 is connected to the feeding end 701, and a radio frequency signal is fed to the second antenna 70 from the feeding end 701.

In this embodiment of this application, the electrical length of the radiator of the second antenna 70 is the ¼ wavelength. Optionally, an electrical length of the first section 24 of the circuit board 20 is approximately the ¼ wavelength, and an electrical length of the second section 25 may be 0 or a multiple of the ¼ wavelength. In this embodiment, the electrical length of the second section 25 is approximately the ¼ wavelength. A feed point A of the slot antenna is located at an end, of a third section 26, closer to the second section 25, and a feed point of the second antenna 70 (that is, a location at which the conductive part 90 is connected to the feeding end 701 of the second antenna 70) is close to an end, of the second section 25, that is away from the third section 26. Therefore, when the second section 25 has a specific electrical length, isolation between the slot antenna and the second section 25 can be raised, so that both the slot antenna and the second antenna 70 have good antenna performance. In this embodiment, a volume of the wireless earphone is comparatively small, and therefore, the second section 25 should not be excessively long. In this embodiment, the electrical length of the second section 25 is approximately the ¼ wavelength, and the second section 25 is bent four times to form a frame structure, so as to ensure the electrical length of the second section 25, and reduce a size of internal space, of the wireless earphone 100, occupied by the second section 25.

In this embodiment of this application, the second antenna 70 can form an antenna current 2B extending from the feeding end 701 to the extreme end 702. In this embodiment, electrical lengths of the first section 24, the second section 25, and the third section 26 of the circuit board 20 are all approximately the ¼ wavelength. Therefore, an electrical length of the circuit board 20 from the feed point of the second antenna 70 to a side of the third section 26 is a sum of electrical lengths of the second section 25 and the third section 26, and is close to a half wavelength; and an electrical length of the circuit board 20 from the feed point of the second antenna 70 to a side of the first section 24 is the electrical length of the first section 24, and is close to the ¼ wavelength. Therefore, an antenna impedance formed by the circuit board 20 from the feed point of the second antenna 70 to the side of the third section 26 is a high impedance, and an antenna impedance formed by the circuit board 20 from the feed point of the second antenna 70 to the side of the first section 24 is a low impedance (close to 50Ω in this embodiment). A ground current 2C of the second antenna 70 is mainly distributed on the first section 24 of the circuit board 20, and a direction of the ground current 2C is from an end, of the first section 24, that is away from the second section 25 to the feeding end 701. Therefore, the second antenna 70 can excite generation of a common mode. The antenna current 2B and the ground current 2C can be combined into the second equivalent current 2A in a resonant mode.

In this embodiment, a slot 27 is disposed on the circuit board 20 to form the slot antenna for exciting generation of a differential mode, and the second antenna 70 is added to the top segment 23 to excite generation of the common mode. The equivalent currents in the two modes are basically orthogonal, so that antenna directivity patterns are complementary to each other, and antenna isolation is comparatively good. In this way, the antennas of the wireless earphone 100 have comparatively good performance, and have good practical application effects.

Figure 15:
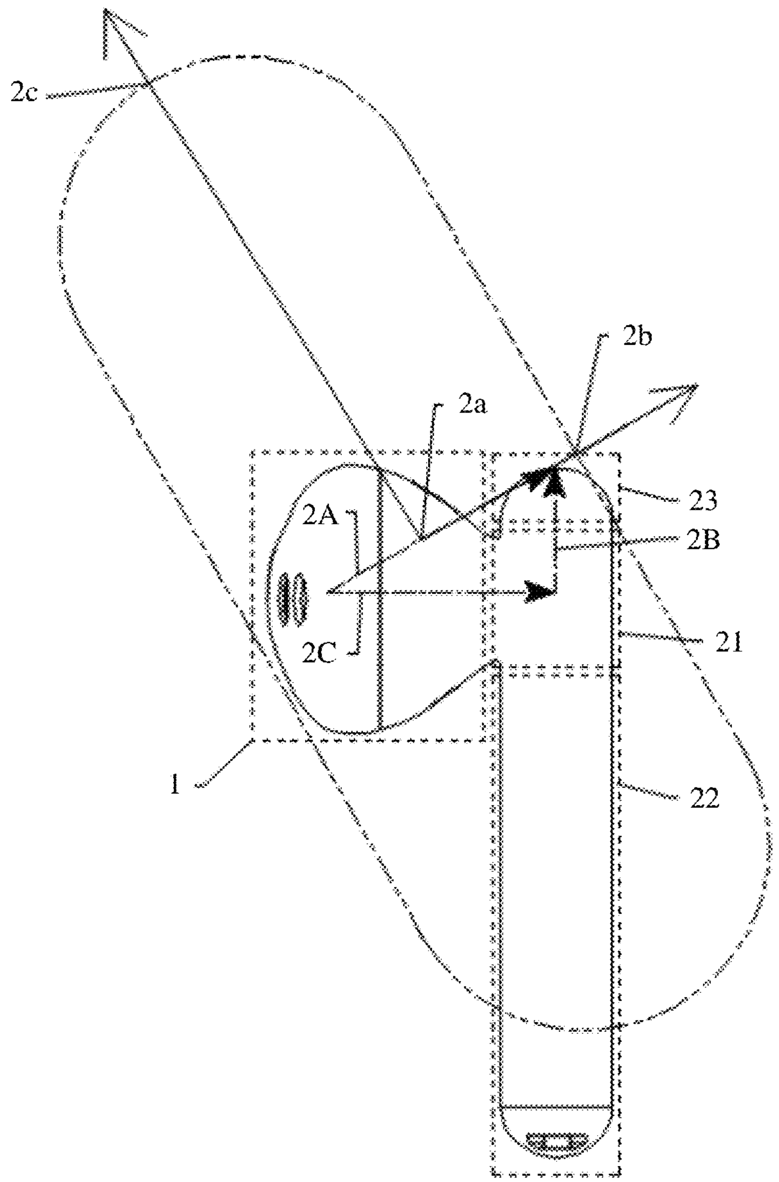
FIG. 15 is a schematic diagram of a radiation field pattern of a second antenna of the wireless earphone in the embodiment shown in FIG. 12.
Figure 16:
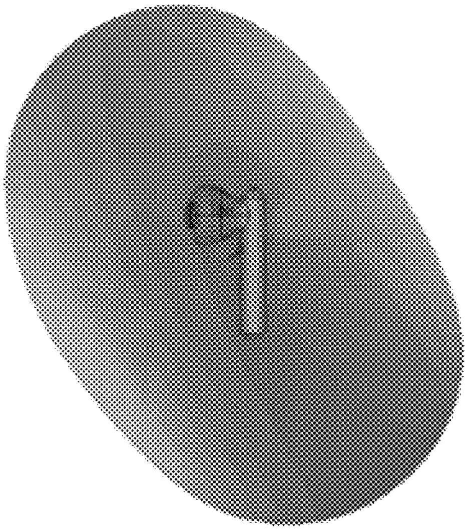
FIG. 16 is a simulation diagram of a radiation field pattern of a second antenna of the wireless earphone in the embodiment shown in FIG. 12.

Refer to FIG. 15 and FIG. 16 together. FIG. 15 is a schematic diagram of a radiation field pattern of the second antenna 70 of the wireless earphone 100 shown in FIG. 12. FIG. 16 is a simulation diagram of the radiation field pattern of the second antenna 70 of the wireless earphone 100 shown in FIG. 12.

As shown in FIG. 15 and FIG. 16, the direction of the second equivalent current 2A of the second antenna 70 of the wireless earphone 100 is from the earbud portion 1 of the wireless earphone 100 to the extreme end 702 of the second antenna 70. A connection line between a center 2*a* of the radiation field pattern and a radiation zero point 2*b* is parallel to the direction from the earbud portion 1 to the extreme end 702 of the second antenna 70. A connection line between the center 2*a* of the radiation field pattern and a radiation intense point 2C is perpendicular to the direction from the earbud portion 1 to the extreme end 702 of the second antenna 70.

Figure 17:
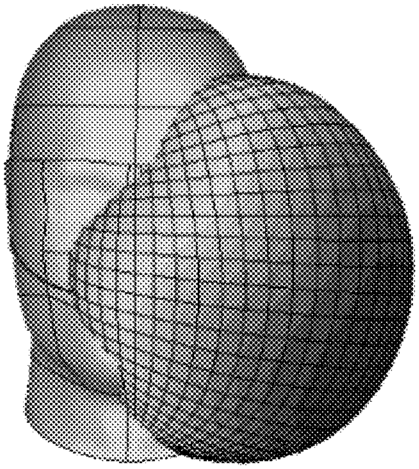
FIG. 17 is a head-phantom radiation pattern of a second antenna of the wireless earphone in the embodiment shown in FIG. 12.
Figure 18:
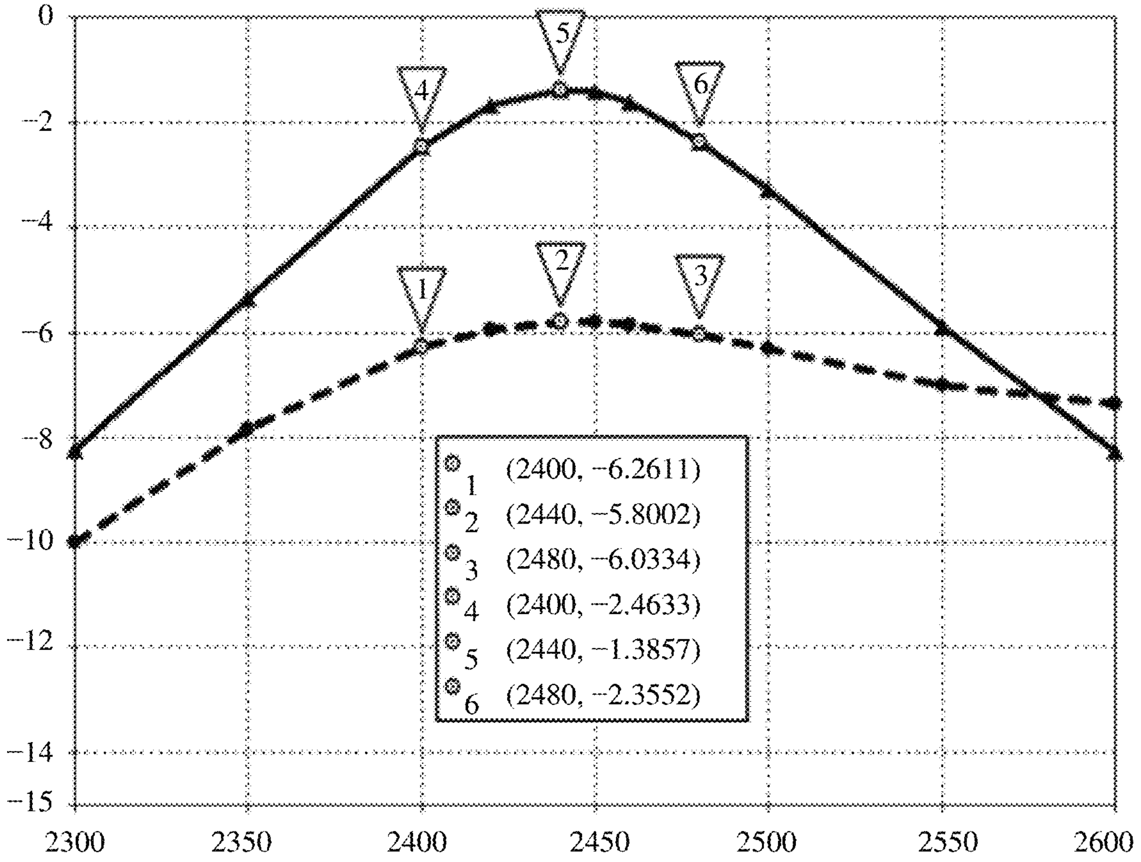
FIG. 18 is an efficiency comparison diagram of a slot antenna and a second antenna of the wireless earphone in the embodiment shown in FIG. 12, in free space.

Refer to FIG. 17 and FIG. 18. FIG. 17 is a head-phantom radiation pattern of the second antenna 70 of the wireless earphone 100 shown in FIG. 12. FIG. 18 is an efficiency comparison diagram of the slot antenna and the second antenna 70 of the wireless earphone 100 shown in FIG. 12, in free space. A solid-line curve in FIG. 18 represents antenna efficiency of the slot antenna of the wireless earphone 100 in free space. A dashed-line curve in FIG. 18 represents antenna efficiency of the second antenna 70 of the wireless earphone 100 in free space. In FIG. 18, a horizontal coordinate represents frequency measured in megahertz (MHz), and a vertical coordinate represents efficiency measured in decibels (dB).

It can be learned from FIG. 18 that the free-space antenna efficiency of the slot antenna and the second antenna 70 of the wireless earphone 100 is approximately −2 dB, and antenna efficiency of both the antennas is higher than antenna efficiency (approximately −13 dB) of a commonly used wireless earphone antenna.

Figure 19:
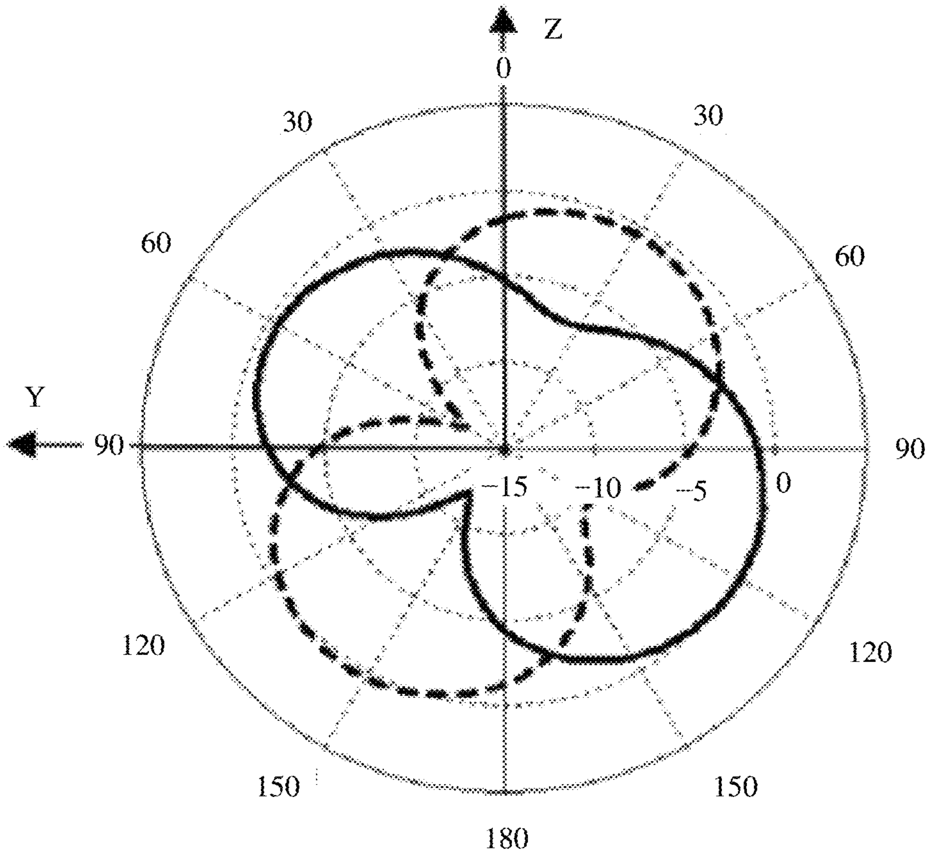
FIG. 19 is a radiation pattern of a vertical section of the wireless earphone in the embodiment shown in FIG. 12, in a free state.

FIG. 19 is a radiation pattern of a vertical section of the wireless earphone in the embodiment shown in FIG. 12, in a free state. The vertical section of the earphone is a plane parallel to a coordinate system YOZ in FIG. 12. FIG. 19 is a polar coordinate view, where different locations in a circumferential direction represent different angles measured in degrees (°), and distances from the different locations to a coordinate center O represent radiation intensity measured in decibels (dBi). It can be easily learned from FIG. 12 that the directivity patterns of the slot antenna and the second antenna 70 are complementary to each other, and polarization forms of the slot antenna and the second antenna 70 are perpendicular to each other. Therefore, antenna isolation is comparatively good, so that the antennas of the wireless earphone 100 have comparatively good performance, and have good practical application effects.

Figure 20:
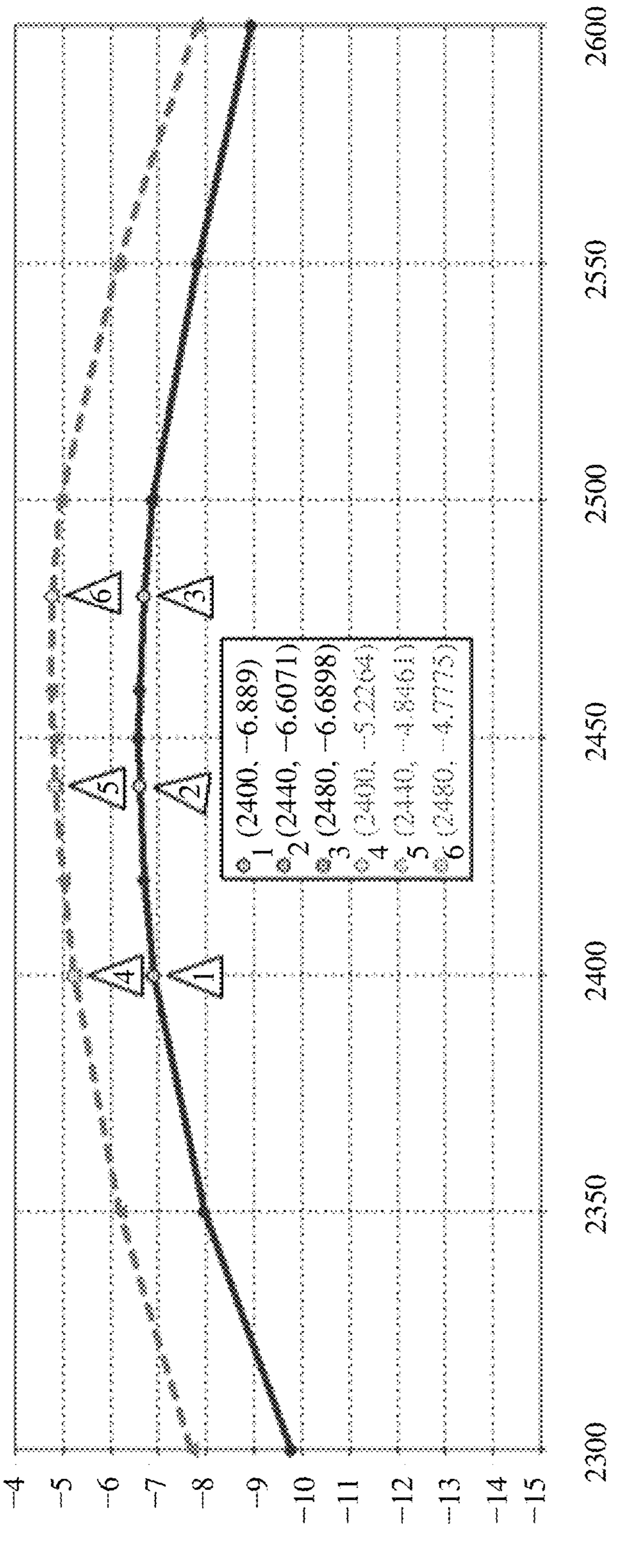
FIG. 20 is an antenna efficiency diagram of the wireless earphone in the embodiment shown in FIG. 12, in a head-phantom state.

FIG. 20 is an antenna efficiency diagram of the wireless earphone 100 in the embodiment shown in FIG. 12, in a head-phantom state (that is, a state in which the wireless earphone 100 is worn on a head of a user). In FIG. 20, a horizontal coordinate represents frequency measured in megahertz (MHz), and a vertical coordinate represents efficiency measured in decibels (dB). A solid-line curve in FIG. 20 represents antenna efficiency of the slot antenna in the head-phantom state. A dashed-line curve in FIG. 20 represents antenna efficiency of the second antenna 70 in the head-phantom state. It can be easily learned from FIG. 20 that the slot antenna and the second antenna 70 both have comparatively high antenna efficiency, and an efficiency difference between the two antennas is small, where the difference is less than 3 dB.

Figure 21:
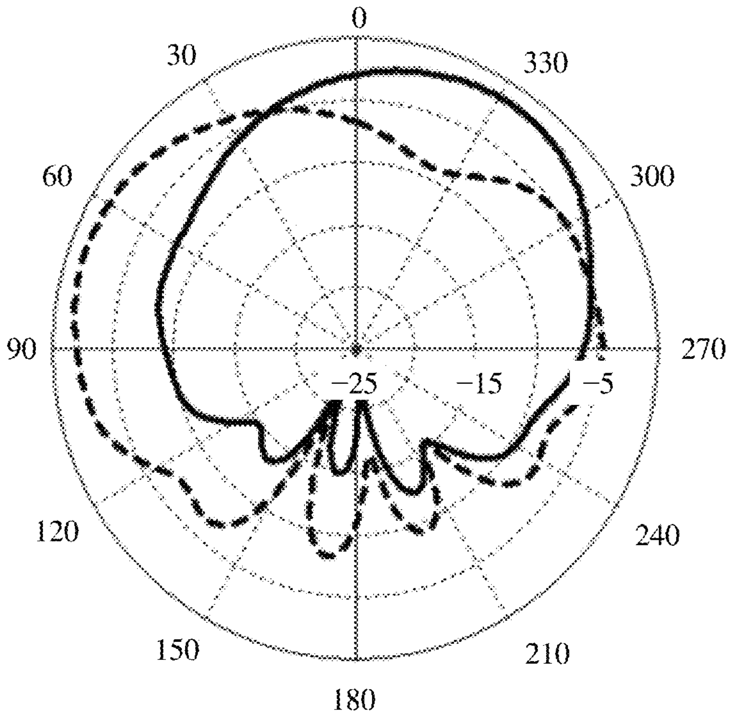
FIG. 21 is a radiation pattern of a head-phantom horizontal section of the wireless earphone in the embodiment shown in FIG. 12, in a head-phantom state.
Figure 22:
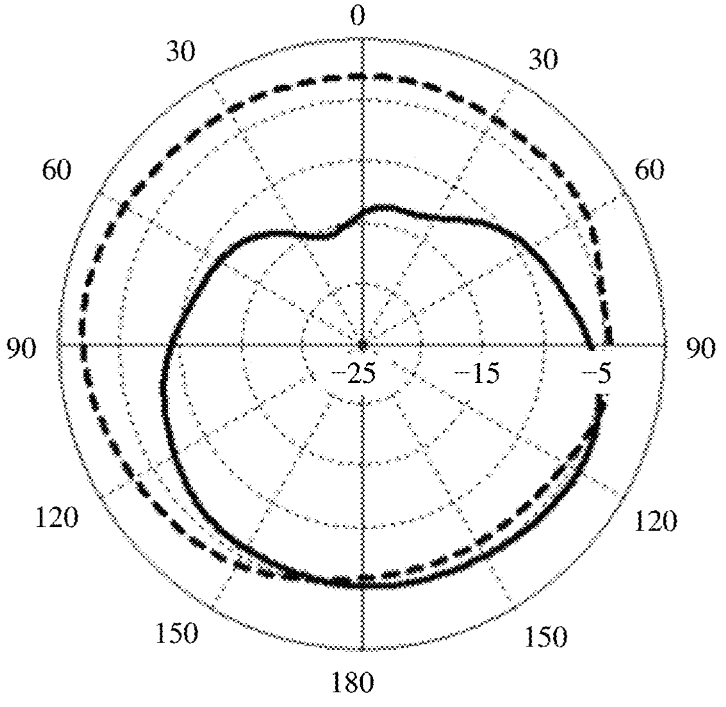
FIG. 22 is a radiation pattern of a section in a front-back direction of a face of a head phantom of the wireless earphone in the embodiment shown in FIG. 12, in a head-phantom state.
Figure 23:
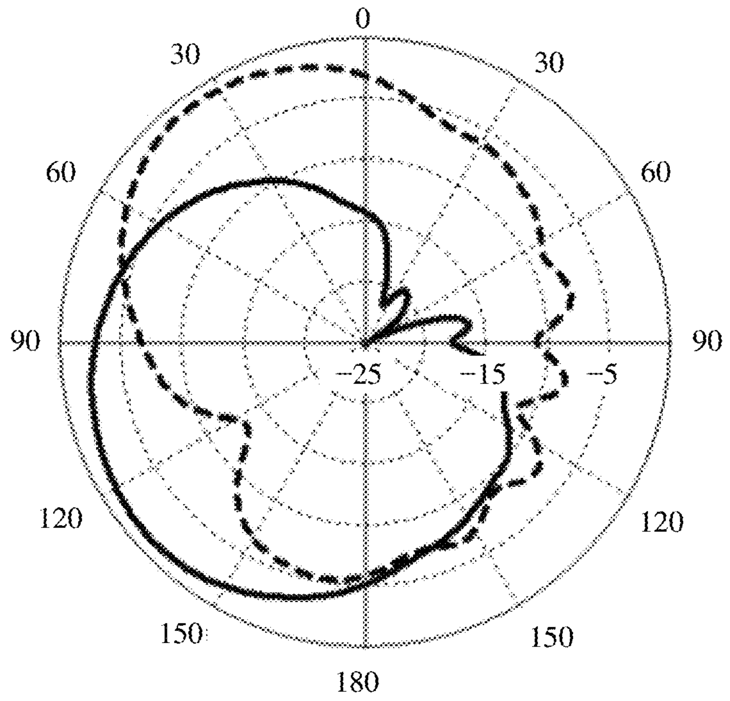
FIG. 23 is a radiation pattern of a section in a direction from a left ear to a right ear of a head phantom of the wireless earphone in the embodiment shown in FIG. 12, in a head-phantom state.

Refer to FIG. 21 to FIG. 23. FIG. 21 is a radiation pattern of a head-phantom horizontal section of the wireless earphone 100 in the embodiment shown in FIG. 12, in the head-phantom state. FIG. 22 is a radiation pattern of a section in a front-back direction of a face of a head phantom of the wireless earphone 100 in the embodiment shown in FIG. 12, in the head-phantom state. FIG. 23 is a radiation pattern of a section in a direction from a left ear to a right ear of the head phantom of the wireless earphone 100 in the embodiment shown in FIG. 12, in the head-phantom state. It can be seen from the figures that radiation patterns of the slot antenna and the second antenna 70 of the wireless earphone 100 are complementary to each other in the head-phantom state, and a complementation effect is obvious, so that omni-directivity of coverage of the earphone is improved.

Figure 24:
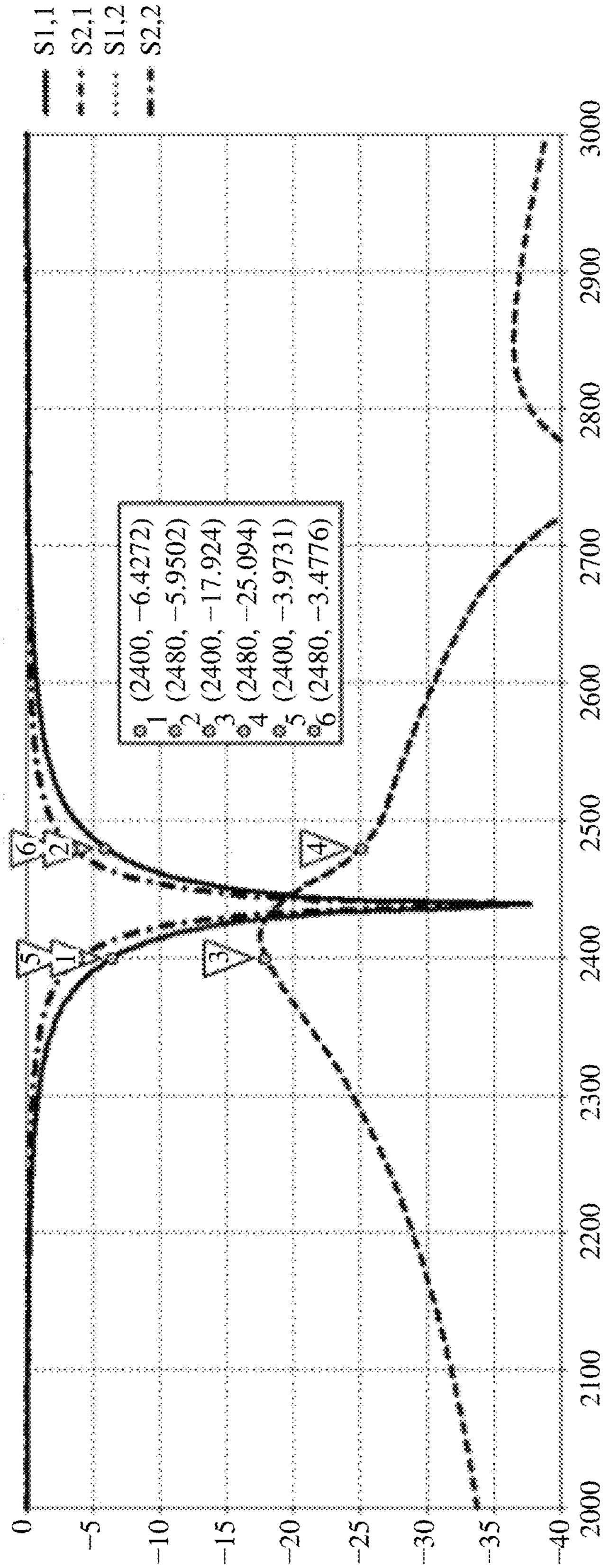
FIG. 24 is an S parameter diagram of an antenna of the wireless earphone in the embodiment shown in FIG. 12.

FIG. 24 is an S parameter diagram of the antenna of the wireless earphone 100 in the embodiment shown in FIG. 12. In FIG. 24, a horizontal coordinate represents frequency measured in megahertz (MHz), and a vertical coordinate represents efficiency measured in decibels (dB). An S12 curve represents a transmission loss from the second antenna 70 to the slot antenna. An S21 curve represents a transmission loss from the slot antenna to the second antenna 70. An S11 curve represents a return loss of the slot antenna. An S22 curve represents a return loss of the second antenna 70. The S21 curve coincides with the S12 curve. It can be learned from the S21 curve that antenna isolation of the wireless earphone 100 can be greater than 17 dB, that is, there is good isolation between the slot antenna and the second antenna 70, so that the antennas of the wireless earphone 100 have comparatively good performance, and have good practical application effects. It can be learned from the S11 curve and the S22 curve that operating frequency bands of the slot antenna and the second antenna 70 both include a Bluetooth frequency band (2400 MHz to 2480 MHz), so that Bluetooth communication of the wireless earphone 100 can be implemented.

Figure 25:
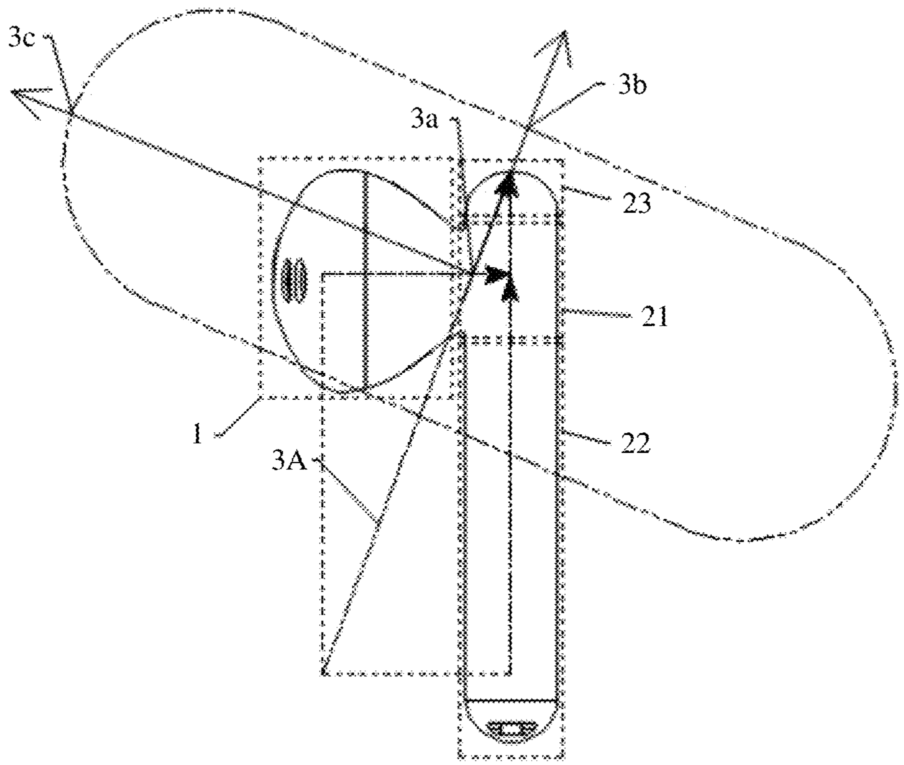
FIG. 25 is a schematic diagram of a radiation field pattern of a second antenna of a wireless earphone according to another embodiment of this application.
Figure 26:
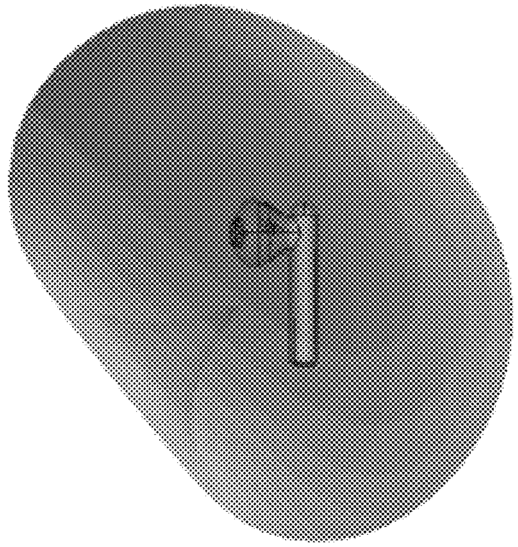
FIG. 26 is a simulation diagram of the radiation field pattern of the second antenna of the wireless earphone in the embodiment shown in FIG. 25.

It may be understood that, in some embodiments of this application, the electrical length of the second section 25 may be alternatively 0, that is, the first section 24 and the third section 26 of the circuit board 20 are directly connected. In this case, the electrical length of the circuit board 20 from the feed point of the second antenna 70 to the side of the third section 26 is the electrical length of the third section 26, and the electrical length of the circuit board 20 from the feed point of the second antenna 70 to the side of the first section 24 is the electrical length of the first section 24, both of which are approximately the ¼ wavelength. Therefore, the ground current of the second antenna 70 is distributed on both the first section 24 and the third section 26 of the circuit board 20. In this case, a second equivalent current 3A formed by the second antenna 70 is shown in FIG. 25. Compared with the second equivalent current 2A of the second antenna 20 in the embodiment shown in FIG. 12, a direction of the current is changed, and a radiation field pattern shown in FIG. 25 and FIG. 26 is formed. FIG. 25 is a schematic diagram of a radiation field pattern of a second antenna 70 of a wireless earphone 100 according to another embodiment of this application. FIG. 26 is a simulation diagram of the radiation field pattern of the second antenna 70 of the wireless earphone 100 in the embodiment shown in FIG. 25. It can be learned from FIG. 25 and FIG. 26 that, in this embodiment, a connection line between a center 3*a* of the radiation field pattern and a radiation zero point 3*b* is parallel to a direction of an equivalent current, and a connection line between the center 2*a* of the radiation field pattern and a radiation intense point 2*c* is perpendicular to the direction of the equivalent current.

Figure 27:
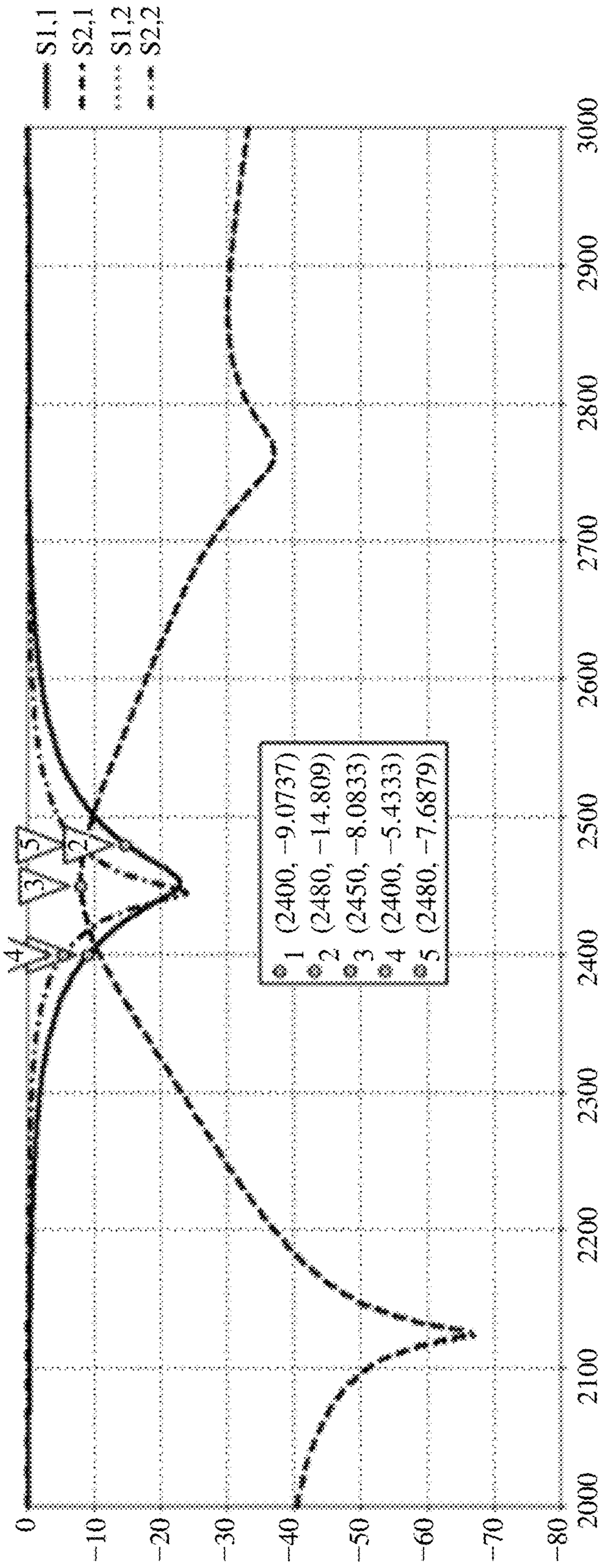
FIG. 27 is an S parameter diagram of an antenna of the wireless earphone in the embodiment shown in FIG. 25.

FIG. 27 is an S parameter diagram of the antenna of the wireless earphone 100 shown in FIG. 25. In FIG. 27, a horizontal coordinate represents frequency measured in megahertz (MHz), and a vertical coordinate represents efficiency measured in decibels (dB). An S12 curve represents a transmission loss from the second antenna 70 to a slot antenna. An S21 curve represents a transmission loss from the slot antenna to the second antenna 70. An S11 curve represents a return loss of the slot antenna. An S22 curve represents a return loss of the second antenna 70. The S21 curve coincides with the S12 curve. It can be learned from the S21 curve that antenna isolation of the wireless earphone 100 can be greater than 8 dB, that is, in this embodiment, isolation between the slot antenna and the second antenna 70 can also be comparatively good, so that the antennas of the wireless earphone 100 have comparatively good performance, and have good practical application effects. It can be learned from the S11 curve and the S22 curve that operating frequency bands of the slot antenna and the second antenna 70 include a Bluetooth frequency band (2400 MHz to 2480 MHz), so that Bluetooth communication of the wireless earphone 100 can be implemented.

To sum up, in the wireless earphone 100 shown in embodiments of this application, the slot antenna is obtained by disposing the slot on the circuit board 20 configured to implement an electrical connection of the internal structure of the wireless earphone 100, so that the antenna of the wireless earphone 100 does not need to additionally occupy internal space of the wireless earphone 100. Moreover, the internal structure of the wireless earphone 100 is simplified, an assembly process is simplified, and production costs are reduced. In addition, the second antenna 70 is added to the top segment 23 of the wireless earphone 100, and through designing, the antenna directivity pattern of the slot antenna and the antenna directivity pattern of the second antenna 70 are complementary to each other, thereby improving received signal strength of the wireless earphone 100 in each angle. Compared with a wireless earphone having only a single antenna, the wireless earphone 100 in this application may have a plurality of polarization manners (for example, vertical polarization and horizontal polarization) of a received signal, and the slot antenna and the second antenna 70 may be designed for different polarizations, so that good signal strength can be obtained regardless of which polarization manner is used for a received signal. A probability of matching a polarization manner of the wireless earphone 100 and a manner of arrival can be improved, thereby improving received signal strength. In addition, the directivity patterns of the slot antenna and the second antenna 70 are complementary to each other, and the slot antenna and the second antenna 70 can be designed for different polarizations, so as to avoid a received signal with strong interference. When quality of a signal received by one antenna is poor, receiving may be switched to the other antenna, thereby improving received signal strength.

On a basis that the wireless earphone 100 in embodiments of this application has two antennas (the slot antenna and the second antenna 70), a corresponding radio frequency front-end circuit 301 may be used, so as to improve signal strength received by the wireless earphone 100. For example, a switched-diversity radio frequency front-end circuit is designed, or a radio frequency front-end circuit of a diversity multiple-input multi-output (Multi-input Multi-output, MIMO) system is designed, so as to improve signal strength received by the wireless earphone 100.

Figure 28:
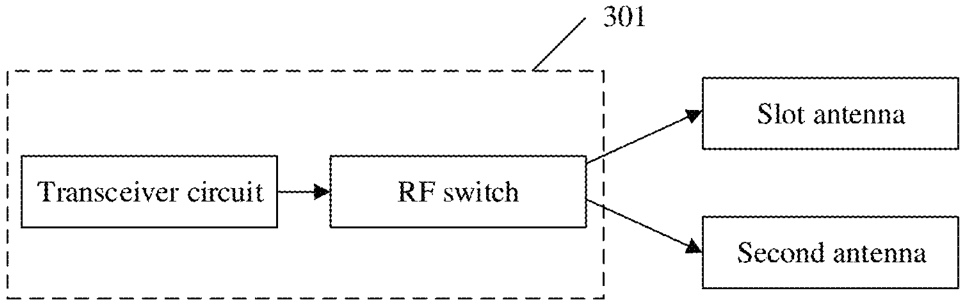
FIG. 28 is a schematic diagram of a radio frequency front-end circuit of the wireless earphone in the embodiment shown in FIG. 12.

FIG. 28 is a schematic diagram of the radio frequency front-end circuit of the wireless earphone 100 in the embodiment shown in FIG. 12. The radio frequency front-end circuit 301 includes a transceiver circuit Tx/Rx, a determining circuit, and an switching switch. The transceiver circuit Tx/Rx includes a receiver circuit Tx and a transmitter circuit Rx. The receiver circuit Tx is configured to process a received signal, and the transmitter circuit Rx is configured to process a transmitted signal. The switching switch is connected between the transceiver circuit Tx/Rx, and the feed point A of the slot antenna and the feed point of the second antenna 70, and is configured to switch between antennas coupled to the radio frequency front-end circuit. The determining circuit is configured to analyze a magnitude of signal strength received by the antenna, and analyze an obtained result to control switching of the switching switch. In this embodiment, the switching switch is a single-pole double-throw switch. In some embodiments, the switching switch may be alternatively another type of switching switch, such as a duplexer. Specifically, the single-pole double-throw switch includes a movable end and two non-movable ends that are switchably connected to the movable end. One of the non-movable ends is electrically connected to a microstrip connected to the slot antenna, and the other non-movable end is electrically connected to a microstrip connected to the second antenna 70.

Figure 29:
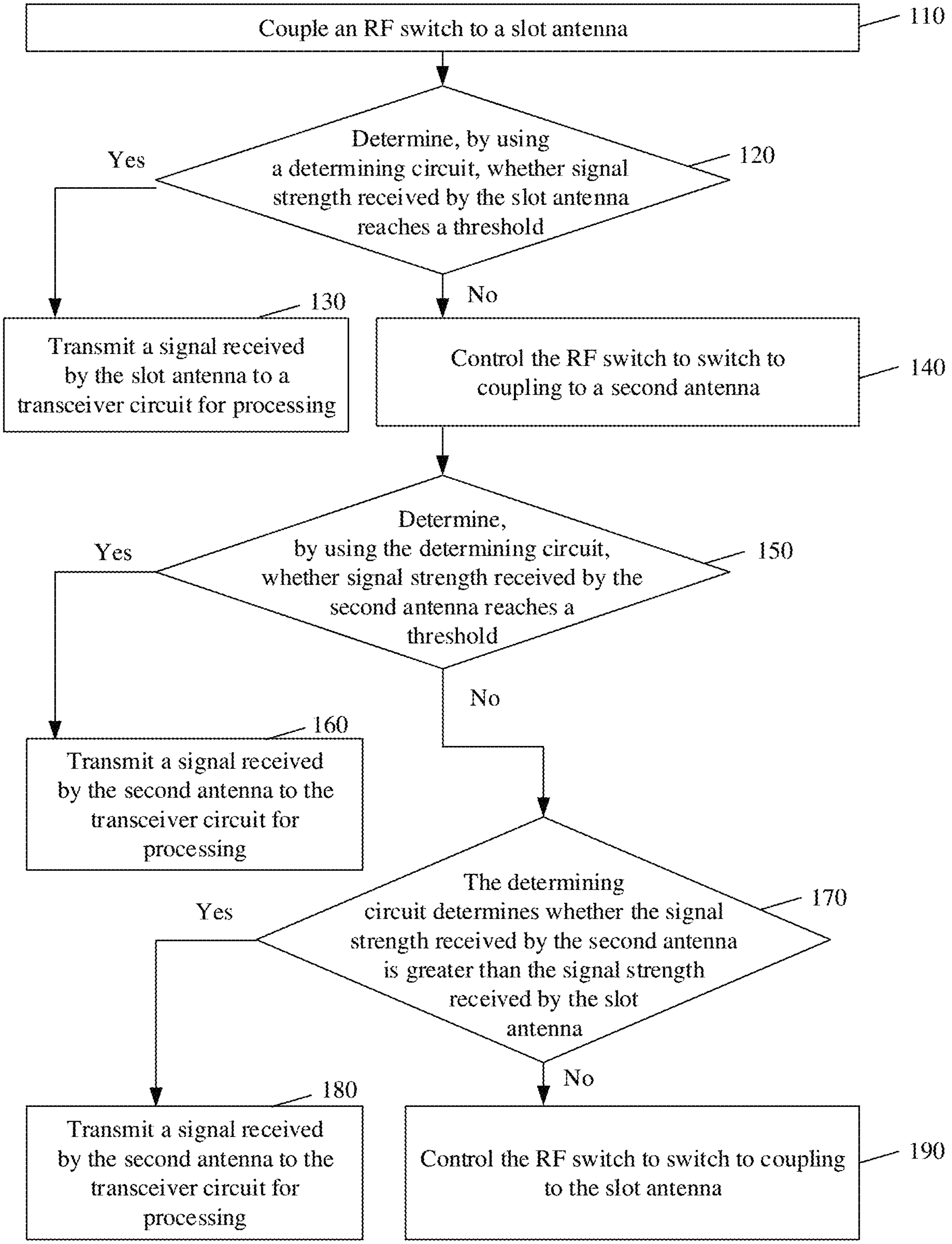
FIG. 29 is a flowchart of an antenna switching method of the wireless earphone in the embodiment shown in FIG. 12.

FIG. 29 is a flowchart of an antenna switching method of the wireless earphone 100 in the embodiment shown in FIG. 12. The antenna switching method of the wireless earphone 100 in this embodiment includes the following steps.

Step 110: Couple the switching switch to the slot antenna.

In this embodiment, the coupling the switching switch to the slot antenna is specifically: switching the movable end of the single-pole double-throw switch to connecting to the non-movable end electrically connected to the microstrip connected to the slot antenna.

Step 120: Determine, by using the determining circuit, whether signal strength (or a packet error ratio (packet error ratio, PER)) received by the slot antenna reaches a threshold.

Step 130: If the signal strength (or the packet error ratio) received by the slot antenna reaches the threshold, transmit a signal received by the slot antenna to the transceiver circuit for processing.

Step 140: If the signal strength (or the packet error ratio) received by the slot antenna does not reach the threshold, control the switching switch to switch to couple to the second antenna.

In this embodiment, the controlling the switching switch to switch to couple to the second antenna is specifically: controlling, by using the determining circuit, the movable end of the single-pole double-throw switch to switch to connecting to the non-movable end electrically connected to the microstrip connected to the second antenna. In some embodiments, the determining circuit further includes a counter module. The counter module is configured to calculate a quantity of times the signal strength (or the packet error ratio) received by the slot antenna does not reach the threshold. Coupling is switched to the second antenna only when the quantity of times the threshold is not reached reaches N, so as to improve accuracy of a determining result. After switching, a counter is reset, to facilitate next counting.

Step 150: Determine, by using the determining circuit, whether signal strength (or a packet error ratio) received by the second antenna reaches a threshold.

Step 160: If the signal strength (or the packet error ratio) received by the second antenna reaches the threshold, transmit a signal received by the second antenna to the transceiver circuit for processing.

Step 170: If the signal strength (or the packet error ratio) received by the second antenna does not reach the threshold, the determining circuit determines whether the signal strength received by the second antenna is greater than the signal strength received by the slot antenna.

When the determining circuit includes the counter module, in step 170, a quantity of times the signal strength received by the second antenna does not reach the threshold may be calculated by using the counter module. When the quantity of times the threshold is not reached reaches N, it is determined whether the signal strength received by the second antenna is greater than the signal strength received by the slot antenna, so as to improve accuracy of a determining result. After switching, a counter is reset, to facilitate next counting.

Step 180: When the signal strength received by the second antenna is greater than the signal strength received by the slot antenna (or the packet error ratio received by the second antenna is less than the packet error ratio received by the slot antenna), transmit a signal received by the second antenna to the transceiver circuit for processing.

Step 190: When the signal strength received by the second antenna is less than the signal strength received by the slot antenna (or the packet error ratio received by the second antenna is greater than the packet error ratio received by the slot antenna), control the switching switch to switch to couple to the slot antenna.

The radio frequency front-end circuit 301 in this embodiment uses a switched-diversity design, to switch, based on an actual requirement, to connecting to the slot antenna or the second antenna 70, thereby improving received signal strength. It may be understood that, with the radio frequency front-end circuit and the antenna in this embodiment, whether to use the slot antenna or the second antenna 70 to transmit a signal can also be selected based on an actual requirement, so as to transmit a signal with comparatively high signal strength.

Figure 30:
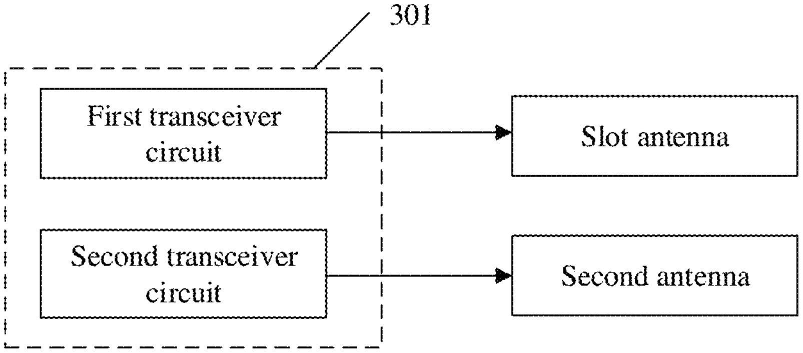
FIG. 30 is a schematic diagram of a radio frequency front-end circuit of a wireless earphone according to another embodiment.

FIG. 30 is a schematic diagram of a radio frequency front-end circuit of a wireless earphone 100 according to another embodiment. The radio frequency front-end circuit 301 includes two transceiver circuits. The two transceiver circuits are a first transceiver circuit Tx1/Rx1 and a second transceiver circuit Tx2/Rx2. The first transceiver circuit Tx1/Rx1 is coupled to a slot antenna, and a signal received by the slot antenna is received by using the first transceiver circuit Tx1/Rx1. The second transceiver circuit Tx2/Rx2 is coupled to a second antenna 70, and a signal received by the second antenna 70 is received by using the second transceiver circuit Tx2/Rx2. In this implementation, the two transceiver circuits can simultaneously receive and process signals received by the slot antenna and the second antenna 70, thereby simultaneously receiving received signals in different transmission directions or different polarization directions, so as to improve received signal strength. It may be understood that, with the radio frequency front-end circuit and the antenna in this embodiment, whether to use the slot antenna or the second antenna 70 to transmit a signal can also be selected based on an actual requirement, so as to transmit a signal with comparatively high signal strength.

The foregoing descriptions are merely specific implementations of this application, but are not intended to limit the protection scope of this application. Any variation or replacement readily figured out by a person skilled in the art within the technical scope disclosed in this application shall fall within the protection scope of this application. When no conflict occurs, embodiments of this application and the features in embodiments may be mutually combined. Therefore, the protection scope of this application shall be subject to the protection scope of the claims.

What is claimed is:

1. A wireless earphone comprising:

an earbud portion comprising a speaker module;

a stalk portion comprising a battery, wherein the earbud portion is connected to one end of the stalk portion;

a circuit board; and a first antenna being a slot antenna, wherein the circuit board extends from the earbud portion to an end of the stalk portion away from the earbud portion, wherein the circuit board is connected to the speaker module and the battery, wherein the circuit board comprises a reference ground, the reference ground extending from one end of the circuit board to another end of the circuit board, and wherein a slot is disposed on the reference ground forming a radiator of the slot antenna, the slot being located in the stalk portion and extending along a length direction of the stalk portion.

2. The wireless earphone according to claim 1, wherein the slot antenna further comprises a coupling stub, the coupling stub being located in the slot, and an extension direction of the coupling stub being the same as the extension direction of the slot, wherein a feed point is disposed on the coupling stub, and wherein the feed point is configured to provide a radio frequency signal to the radiator of the slot antenna.

3. The wireless earphone according to claim 2, wherein the coupling stub extends from an end of the slot closer to the earbud portion to an end of the slot away from the earbud portion, and wherein the feed point is located at an end of the coupling stub closer to the earbud portion.

4. The wireless earphone according to claim 2, wherein the wireless earphone comprises a microstrip, one end of the microstrip being electrically connected to the feed point, wherein the microstrip is configured to transmit the radio frequency signal for the slot antenna, and wherein the microstrip comprises a transmission portion and a coupling portion connected to the transmission portion, the coupling portion extending in the slot forming the coupling stub of the slot antenna.

5. The wireless earphone according to claim 1, wherein a length of the slot is a quarter of a wavelength corresponding to an operating frequency band of the slot antenna, and wherein an opening is disposed at one end of the slot.

6. The wireless earphone according to claim 5, wherein the slot antenna comprises a feed point, wherein the feed point is configured to provide a radio frequency signal to the radiator of the slot antenna, wherein the feed point is located at a periphery of the slot, and wherein a distance between a location of the feed point and an end of the slot, away from the opening, is a $\frac{1}{20}$ wavelength.

7. The wireless earphone according to claim 6, wherein the stalk portion comprises:

a connecting segment connected to the earbud portion, and a bottom segment located on one side of the connecting segment, wherein an arrangement direction of the earbud portion and the connecting segment intersects an arrangement direction of the connecting segment and the bottom segment, wherein the battery is located in the bottom segment, wherein the circuit board comprises a first section, a second section, and a third section that are sequentially connected, the first section being located at the earbud portion, the second section being located at the connecting segment, and the third section being located at the bottom segment, wherein the slot is arranged, from a location at which the third section is connected to the second section, in a direction in which the third section extends away from the second section, wherein a sum of electrical lengths of the first section and the second section is greater than or equal to a $\frac{1}{4}$ wavelength, and wherein an electrical length of the third section is greater than or equal to the $\frac{1}{4}$ wavelength.

8. The wireless earphone according to claim 1, wherein the stalk portion comprises:

a connecting segment connected to the earbud portion, and a top segment and a bottom segment that are located on two sides of the connecting segment, wherein an arrangement direction of the earbud portion and the connecting segment intersects an arrangement direction of the connecting segment, the bottom segment and the top segment, the battery being located in the bottom segment, and wherein the wireless earphone further comprises a second antenna, the second antenna being located in the top segment, a radiator of the second antenna comprising a feeding end and an extreme end away from the feeding end, and the feeding end being closer to the connecting segment than the extreme end.

9. The wireless earphone according to claim 8, wherein the slot antenna is configured to excite the circuit board to generate a first equivalent current from the end of the stalk portion away from the earbud portion to an end of the earbud portion away from the stalk portion, and wherein the second antenna is configured to excite the circuit board to generate a second equivalent current, a direction of the second equivalent current intersecting a direction of the first equivalent current.

10. The wireless earphone according to claim 9, wherein the circuit board comprises a first section, a second section, and a third section that are sequentially connected, the first section being located at the earbud portion, the second section being located at the connecting segment, the third section being located at the bottom segment, wherein an electrical length of the radiator of the second antenna is a ¼ wavelength, and wherein an electrical length of the first section is the ¼ wavelength.

11. The wireless earphone according to claim 10, wherein the slot antenna comprises the feed point, the feed point being located at an end of the third section closer to the second section, wherein the feeding end of the second antenna is close to an end of the second section away from the third section, and wherein an electrical length of the second section of the circuit board is the ¼ wavelength.

12. The wireless earphone according to claim 11, wherein an electrical length of the third section of the circuit board is the ¼ wavelength.

13. The wireless earphone according to claim 12, wherein the direction of the second equivalent current is a direction from the end of the earbud portion, which is away from the stalk portion to the extreme end, and wherein the direction of the first equivalent current is orthogonal to the direction of the second equivalent current.

14. The wireless earphone according to claim 12, wherein the second section of the circuit board is disposed in the connecting segment in a bent manner.

15. The wireless earphone according to claim 8, wherein the wireless earphone comprises an antenna support, the antenna support being located in the top segment, and wherein the radiator of the second antenna is disposed around the antenna support.

16. The wireless earphone according to claim 8, wherein the second antenna is a monopole antenna or an inverted F antenna.

17. The wireless earphone according to claim 8, further comprising a radio frequency front-end circuit coupled to the slot antenna and the second antenna, and configured to transmit radio frequency signals to the slot antenna and the second antenna or process radio frequency signals received by the slot antenna and the second antenna, wherein the radio frequency front-end circuit comprises an switching switch, the switching switch configured to switch the radio frequency front-end circuit so that it couples to the slot antenna or the second antenna.

18. The wireless earphone according to claim 8, further comprising a radio frequency front-end circuit having a first transceiver circuit and a second transceiver circuit, wherein the first transceiver circuit is coupled to the slot antenna, and the second transceiver circuit is coupled to the second antenna.

* * * * *